US012254743B2

(12) United States Patent
Nicely

(10) Patent No.: US 12,254,743 B2
(45) **Date of Patent: *Mar. 18, 2025**

(54) SYSTEM, DEVICE AND METHOD FOR PROVIDING AN INTERACTIVE GAMBLING GAME

(71) Applicant: Mark C. Nicely, Daly City, CA (US)

(72) Inventor: Mark C. Nicely, Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,514

(22) Filed: Sep. 5, 2023

(65) Prior Publication Data

US 2023/0410597 A1 Dec. 21, 2023

Related U.S. Application Data

(63) Continuation of application No. 17/499,075, filed on Oct. 12, 2021, now Pat. No. 11,749,061, which is a continuation of application No. 16/788,208, filed on Feb. 11, 2020, now Pat. No. 11,145,162, which is a continuation of application No. 14/868,172, filed on Sep. 28, 2015, now Pat. No. 10,559,163.

(60) Provisional application No. 62/056,393, filed on Sep. 26, 2014.

(51) Int. Cl.
*G07F 17/32* (2006.01)

(52) U.S. Cl.
CPC ...... *G07F 17/3244* (2013.01); *G07F 17/3209* (2013.01); *G07F 17/3213* (2013.01); *G07F 17/3267* (2013.01); *G07F 17/3269* (2013.01)

(58) Field of Classification Search
CPC ............. G07F 17/3244; G07F 17/3209; G07F 17/3213; G07F 17/3267; G07F 17/3269
See application file for complete search history.

(56) References Cited

U.S. PATENT DOCUMENTS

2014/0087841 A1 * 3/2014 Council .............. G07F 17/3244
463/25

* cited by examiner

*Primary Examiner* — David L Lewis
*Assistant Examiner* — Shauna-Kay Hall
(74) *Attorney, Agent, or Firm* — Newman Law, LLC

(57) ABSTRACT

Methods and systems in which a plurality of plays is offered on a plurality of games, wherein the math model of a first game differs from the math model of a second game and wherein the player may specify at least one of the first and second games to receive additional plays and/or additional wagering.

17 Claims, 17 Drawing Sheets

SYSTEM, DEVICE AND METHOD FOR PROVIDING AN INTERACTIVE GAMBLING GAME

CROSS REFERENCE TO RELATED APPLICATION

This application claims the priority benefit of U.S. Provisional Patent Application No. 62/056,393 which was filed Sep. 26, 2014, the disclosure of which is incorporated herein by reference.

BACKGROUND OF THE INVENTION

The present disclosure relates to gaming systems and devices. More particularly, the present disclosure is a method and system in which a plurality of plays is offered on plurality of games for a single wager, wherein the math model of a first game differs from the math model of a second game with the difference not being obvious before any games are played.

Gaming machines, such as a slot machine, are well known and enjoyed. Casino games, including slot machine games, video poker games, video keno games or video blackjack games are an important source of income for the gambling industry. Accordingly, casinos (including brick-and-mortar and online casinos) constantly search for new gaming strategies and features to provide additional incentives for players to continue play and to distinguish play at their establishments from competitors in the industry.

One of the most popular gaming machines are slot machines that typically fall within two broad regulatory categories: (a) Class III and (b) Class II. Class III devices are often referred to as "Vegas-Style" games and are noted by having purely random game outcomes determined on the fly and independent of prior outcomes. The present disclosure can be applied to Class III gaming machines.

Class II devices, on the other hand, which can be found in certain Native American Casinos in North America whose jurisdictions do not allow "Vegas-style" Class III devices, do not directly and randomly generate game outcomes. Rather, Class II devices usually use an indirect method for outcome selection based upon (a) multi-player bingo; or (b) pull-tabs (whether physical or electronic). In the case of bingo-based outcomes, game outcomes displayed to the player, such as a slot game display, are mapped from the bingo card pattern associated with that game display. In the case of pull-tab-based outcomes, all game outcomes are predetermined by the game provider, similar to how a state lottery will preprint one set of outcomes for a scratcher game. Similar to a scratcher game, the predetermined outcomes for a given pull-tab-based Class II game are randomized, and once a given outcome is sold to a player that particular outcome is removed from the pool of available outcomes. Relative to the specific implementation, an additional randomization step may be applied in terms of the selection of groups of outcomes and/or each specific outcome from the same pool. The present disclosure can also be applied to Class II gaming machines.

In terms of slot machine implementation, there are three fundamental types: (a) mechanical slots; (b) electro-mechanical slots; and (c) video slots, including slot games offered on the Internet and on mobile devices. Mechanical slots are rarely found outside of museums or personal collections. If found in a casino, these are usually for display purposes only.

Electro-mechanical slots resemble mechanical slots insofar as they feature physical reels which are computer controlled via stepper motors or any suitable motion control technology. Because the outcomes are computer generated, a given set of slot reels can offer innumerable different gaming propositions relative to the method of outcome generation which most often involves some variation of reel-strip weighting as described in the Telenes U.S. Pat. No. 4,448,419. The present disclosure can be applied to electro-mechanical slots.

Video-based slots or "video slots" use one or more electronic display devices to show game outcomes to the player. Like with electro-mechanical slots, Video Slot outcomes are computer generated. However, unlike electro-mechanical slots, video slots offer a wider array of spinning reel depictions because a video-based display is not limited to the 22 symbol positions per slot reel as typically found in slot machines with physical reels. Though video slots can replicate the outcome generation mechanisms used in electro-mechanical outcome generation, other mechanisms are possible as well such as (a) weighted reel strips with fewer or greater than 22 reel strip positions; (b) uniformly weighted reel strips (usually much larger than 22 reel strip positions); (d) reel strips dynamically populated for each spin such as described in the Super Stacks patent disclosure US 20120083327; or (e) any other suitable mechanism. The present disclosure can be applied to electro-mechanical slots and video-based emulation of electro-mechanism and video slots.

There are many different reel spin display mechanisms possible with video slots. These can include: (a) use of highly blurred animation from which specific symbols in specific order cannot be readily observed; (b) use of animation from which specific symbols in specific order can be readily observed, the animation being of the reel strip used in outcome generation; (c) use of animation from which specific symbols in specific order can be readily observed, the animation being of a reel strip constructed purely for display purposes and which does not exactly match the reel strips used in outcome generation; or (d) use of a real-time random symbol selection mechanism for both selection of symbols to be displayed during the reel spins and symbols for the final game outcome from which general symbol frequencies may be observed; or (e) any other suitable mechanism. The present disclosure can be applied to any of these reel spin animation mechanism.

Class III video reel slot machines found in land-based casinos in the US that use of animation from which specific symbols in specific order can be readily observed, the animation being of the reel strip used in outcome generation, typically execute the following some variation of the following procedures each time a reel game is played:

- STEP 1: randomly select a stopping position for each reel strip, where: (a) for unweighted reels, each position is uniformly likely; and (b) for weighted reels/a table of weights for each reel strip position is used to map a uniformly selected random number into a reel strip position; and (c) the reel stop position for each reels is independently determined
- STEP 2: start reel spin animation using the symbols assigned just above the current reel strip position (referred to as roll-off);
- STEP 3: at some point prior to a given reel spin stopping, the symbols selected for display during the reel spin are those that appear just below of the final symbols that are to land as the final outcome (referred to as roll-in).

Just like their real-world equivalent, virtual reels also loop such that a continuous linear chain of symbols is formed with the symbol in the last position of an array of slot symbol indicators effecting acting as the symbol to appear before the last position of an array of slot symbol indicators. Relative to the specific implementation, the transition of symbols selected in STEP 2 to symbols being selected in STEP 3 can occur any time between the start of a reels spins and its finish. In some implementation, the transition occurs when there are a certain number of additional symbols to spin by before the reel stops spinning, on a reel by reel basis. In some other implementations the transition occurs for all reels at the same time. At one extreme, STEP 3 is bypassed altogether with the symbols from the final position appearing after whatever the current symbol from STEP 2 is. At the other one extreme, STEP 2 is bypassed altogether and the very first symbol to appear at the start of a new spin is k number of symbol positions away from the specified ending position, where the later a given reel is to stop spinning, the larger the value k needs to be. Such implementations are not typically used in client/server based implementations (discussed further below) because the client does not have access to the identity of the final reel strip positions.

Every Class II and Class III gambling game can be mathematically characterized in terms of its mathematical Expected Value. Known in the gaming industry as "payback percentage", "return to player", or simply "RTP", the mathematically expected value for a given game reflects its long-term expected ratio of (awards paid out)/(wagers taken in). For a given Class II pull-tab or electronic-pull-tab game, as well as for a fixed pool of lottery scratch-off tickets, the RTP across the entire pool of tickets is known exactly. For any other given gambling game, the actual RTP tends towards the theoretical RTP over long-term play across multiple players. In other words, more plays of a given game at a given wager size, the more likely the actual RTP of that game will converge to its theoretical RTP.

Some slot games are offered in a multiple reel set format where the player is able to play at least two slot games in a single proposition. In some embodiments, the reel sets are entirely independent. In some variations, the game theme between reel sets varies. In some variations, the reel sets are based on the same theme but incorporate one or more differences in the symbols used and/or the corresponding payouts. In some variations, the reel sets use all the same game and math elements. In some embodiments, there is an opportunity for interdependence between reel sets such as with a "wild rollover" feature, or "tumble thru" feature, or a communal triggering feature, etc. In some embodiments, the player has the option of playing less than all reel sets in the same proposition. In some variations, optionally enabled reel sets are enabled/disabled in a predetermined order relative to the number of reel sets the player wishes to play. In other variations, the player is able to enable or disable specific reel sets. In some embodiments, the player cannot play fewer than all available reel sets.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine generally indicates this to the player through one or more visual and/or audio output devices, such as the reels, lights, speakers, and video screens.

For the vast majority of slot games, the main or primary game is a non-interactive experience for the player. After selecting wager size and/or wager configuration, the player's only decision is whether or not to play; the player's only input is to activate a new play of the game. In the case of games with AUTOPLAY functionality, a given player also has the option to activate a series of plays of their given game and if so activated, the option to subsequently disable the completion of the series if the entire series has not already been played out and if the series has not terminated due to a terminating event such as insufficient balance; triggering of a bonus; triggering of an especially large award or any other terminating event defined by the given game.

Many secondary or bonus games, on the other hand, are known to offer varying amounts of player interactivity. In some bonus game implementations, the player must press a button or touch the display screen in order to start the bonus play. In some bonus game implementations, the player must make blind selections or picks in order to reveal prizes and/or to progress with the bonus game. In some bonus implementations, the player is offered additional gambling propositions in which the player can optionally participate. In some bonus implementations, the player is provided the choice of play experience. In some bonus implementations, the player is provided the choice of bonus play attributes such as choosing a specific combination of free spins at a certain award multiplier or from a certain range of award multipliers. In some bonus implementations, the player is provided with an opportunity to control a video game, the outcomes of which lead to varying prize revelations. In some bonus implementations, the player is required to make strategic selections that can affect their bonus outcome such as selecting whether the next unrevealed standard playing card has a rank higher or lower than the rank of the most-recently revealed standard playing card.

Presently, the jurisdictional body for Nevada, the Nevada Gaming Control Board, is considering regulation and policy updates to better address the issue of the use of non-strategic skill in games of chance. Such non-strategic skills could include hand-eye-coordination skills (sometimes referred to as "Twitch Skill"), such as required to play video games such as Pong™ or Breakout™. Alternately or additionally, such non-strategic skills could include puzzle-solving skills (which we'll refer to as "Puzzle Skill") not directly related to a gambling proposition selection, such as required to play video games such as Bejeweled™ or Boggle™. Video games such as Tetris™ and Missile Command™ require a combination of Twitch Skill and Puzzle Skill.

Gambling game devices encompass more than just slot machines (which are often referred to in the gaming industry as Electronic Gaming Machines). Games of chance for monetary currency and virtual currency are available on numerous personal devices, such as laptops, mobile phones, smart phones, personal digital assistant (PDA), and tablets via a networked connection such as the Internet/World Wide Web, mobile service provider networks, and casino premises closed networks to name a few. Many such implementations rely upon a client/server architecture wherein all game outcome generation occurs on a casino or game provider's central server such that a compromised client device cannot cause unearned payouts.

There continues to be a need to provide devices and game methods which offer novel game and gaming opportunities.

SUMMARY OF THE INVENTION

The present disclosure introduces an interactive visual-based skill opportunity for players to improve their payback potential within a game of the gaming device. The method and system of the present disclosure includes Nd≥2 number of game display areas to which Nm≥2 different math models are associated and from which the player is offered Np≥2 plays for a given wager. Each such play occurs in one of the game display areas, and the player is given some choice in terms of which game display areas receive which additional play and/or additional wager amount.

The theoretical RTP values of the available math models are not all the same. Thus it is in the player's best interest to: (a) determine which game display area has been assigned the highest RTP; and (b) use as many available plays as possible on that game display area. Therefore, this invention adds an observational skill component directly to a gaming experience.

Some embodiments of the invention are directed to an electronic gaming system comprising at least one processor; at least one display device; at least one random number generator; at least one input device; and at least one memory device storing a plurality of instructions which, when executed by the at least one processor, cause the at least one processor to operate with the at least one display device and the at least one input device to: display a plurality of independent games on the at least one display device responsive to receiving input data relating to an amount available for wagering through the at least one input device, wherein each of a plurality of independent games displayed is associated with one of a plurality of sets of game outcome determination parameters; receive a game play selection from the at least one input device, the game play selection identifying at least one first independent game of the plurality of independent games to play for at least one first wager amount and identifying at least one second independent game to be played for least one second wager amount; generate a game outcome for each of the at least one first and the at least one second independent games responsive to receiving the game player selections; determine any award associated with any displayed winning game outcome in the at least one first and the at least one second independent games responsive to generating each of the game outcomes; and provide any determined award, wherein the determined award is enabled for wagering through the input device.

In some embodiments of the aforementioned gaming system, a first set of game outcome determination parameters associated with at least one first independent game provides a first mathematically expected long-term return to player payback percentage and a second set of game outcome determination parameters associated with at least one second independent game provides a second mathematically expected long-term return to player payback percentage which differs from the first mathematically expected long-term return to player payback percentage.

In some embodiments of the aforementioned gaming system, the gaming system associates a first set of game outcome determination parameters with at least one first independent game and associates a second set of game outcome determination parameters associated with at least one second independent game.

In some embodiments, the associations are randomly determined at least once every play session.

In some embodiments, the associations are randomly determined upon the evaluation of a threshold condition. The threshold condition may be based on the number of independent games played since the gaming system last performed the associations. The threshold condition may be based on the number of game play sessions initiated since the gaming system last performed the associations. The threshold condition may be based on the occurrence of at least one specified outcome from the play of at least one independent game. The at least one specified outcome may be a winning outcome or a non-winning outcome.

In some embodiments, the gaming system provides indication of at least one defining characteristic of the set of game determination outcome parameters associated specifically with at least one independent game. The indication may occur at the end of the play session, and may be based on some condition.

In some embodiments, the gaming system provides a plurality of rounds of play in which the play of at least one independent game is provided per round of play.

In some embodiments, the independent games include slot games and a distinguishing mark is added to the slot reel, such as for example, a special subsymbol, such as a gold star on the corner of either a random symbol or on a particular symbol which may be a wild symbol. In this embodiment, on the rich reel set, at least one wild symbol will get a lucky star overlay. If the marked wild symbol appears in an outcome but is not involved in a winner, this will cause the system to select one of the other reel sets to get the rich math starting with the next game. If the marked wild symbol appears in an outcome and that symbol is used for the formation of a winning outcome, then then that symbol is figuratively stunned and so is guaranteed to stay. The symbol may stay indefinitely until a condition occurs or may stay for a minimum number of games or spins.

The gaming system described herein may have at least one slot game which is Class II and/or Class III compliant. In the case of a Class II compliant game, the corresponding set of game outcome determination parameters includes specification of the mapping of bingo outcomes to slot game outcomes or specification of the game outcome pool from which the outcome is to be drawn.

In some embodiments, the animation assets used to display reel spins from a first set of game outcome determination parameters are different from the animation assets used to display outcomes from a second set of game outcome determination parameters.

In some embodiments, a reel spin animation can be displayed for a first set of game outcome determination parameters model but not a second first set of game outcome determination parameters based on an index provided by the system used for starting reel strip animation from a particular position within the corresponding reel strip animation assets, wherein the index would never be provided for displaying the outcome of a second math model.

Some embodiments of the invention are directed to a method of providing electronic games on an electronic gaming device, the electronic gaming device including at least one processor, at least one display device, at least one random number generator, at least one input device, and at least one memory device storing a plurality of instructions which, when executed by the at least one processor, cause the at least one processor to operate with the at least one display device, the at least one random number generator and the at least one input device, all in connection with the method comprising the steps of: displaying a plurality of independent games on the at least one display device responsive to receiving input data relating to an amount available for wagering through the at least one input device, wherein each of a plurality of independent games displayed is associated with one of a plurality of sets of game outcome determination parameters; receiving a game play selection from the at least one input device, the game play selection identifying at least one first independent game of the plurality of independent games to play for at least one first wager amount and identifying at least one second independent game to be played for least one second wager amount, wherein a first set of game outcome determination parameters associated with at least one first independent game provides a first mathematically expected long-term return to player payback percentage and a second set of game outcome determination parameters associated with at least one second independent game provides a second mathematically expected long-term return to player payback percentage which differs from the first mathematically expected long-term return to player payback percentage; generating a game outcome for each of the at least one first and the at least one second independent games responsive to receiving the game player selections; determining any award associated with any displayed winning game outcome in the at least one first and the at least one second independent games responsive to generating each of the game outcomes; and providing any determined award, wherein the determined award is enabled for wagering through the input device.

In some embodiments of the aforementioned method, the processor associated a first set of game outcome determination parameters with at least one first independent game and associates a second set of game outcome determination parameters associated with at least one second independent game.

In some embodiments of the aforementioned method, the associations are randomly determined at least once every play session.

In some embodiments of the aforementioned method, the associations are randomly determined upon the evaluation of a threshold condition.

In some embodiments of the aforementioned method, the threshold condition is based on the number of independent games played since the gaming system last performed the associations.

In some embodiments of the aforementioned method, the threshold condition is based on the number of game play sessions initiated since the gaming system last performed the associations.

In some embodiments of the aforementioned method, the threshold condition is based on the occurrence of at least one specified outcome from the play of at least one independent game.

In some embodiments of the aforementioned method, the threshold condition is based on the occurrence of at least one specified outcome from the play of at least one independent game.

In some embodiments of the aforementioned method, the at least one specified outcome is a winning outcome.

In some embodiments of the aforementioned method, the at least one specified outcome is a non-winning outcome.

In some embodiments of the aforementioned method, the gaming system provides indication of at least one defining characteristic of the set of game determination outcome parameters associated specifically with at least one independent game.

In some embodiments of the aforementioned method, the indication occurs at the end of the play session.

In some embodiments of the aforementioned method, the indication occurs before the end of the play session based on some condition.

Some embodiments of the invention are directed to a method of administering a wagering game over a communication network, comprising the steps of: providing a game server and a user interaction server; providing, by the user interaction server, a client for execution on a user device connected to the network and associated with a player, the user device being remote from the game server; the game server communicating to the user interaction server and the user interaction server communicating to the user device a display of a plurality of independent games on the user device, wherein each of a plurality of independent games displayed is associated with one of a plurality of sets of game outcome determination parameters; the client receiving from the user device and communicating to the game server, a game play selection identifying at least one first independent game of the plurality of independent games to play for at least one first wager amount and identifying at least one second independent game to be played for least one second wager amount, wherein a first set of game outcome determination parameters associated with at least one first independent game provides a first mathematically expected long-term return to player payback percentage and a second set of game outcome determination parameters associated with at least one second independent game provides a second mathematically expected long-term return to player payback percentage which differs from the first mathematically expected long-term return to player payback percentage; the game server generating a game outcome for each of the at least one first and the at least one second independent games responsive to receiving the game player selections and determining any award associated with any game outcome in the at least one first and the at least one second independent games responsive to generating each of the game outcomes; and the game server communicating to the user interaction server and the user interaction server communicating to the user device any determined award, wherein the determined award is enabled for wagering through the input device.

DETAILED DESCRIPTION OF THE INVENTION

Figure 1A:
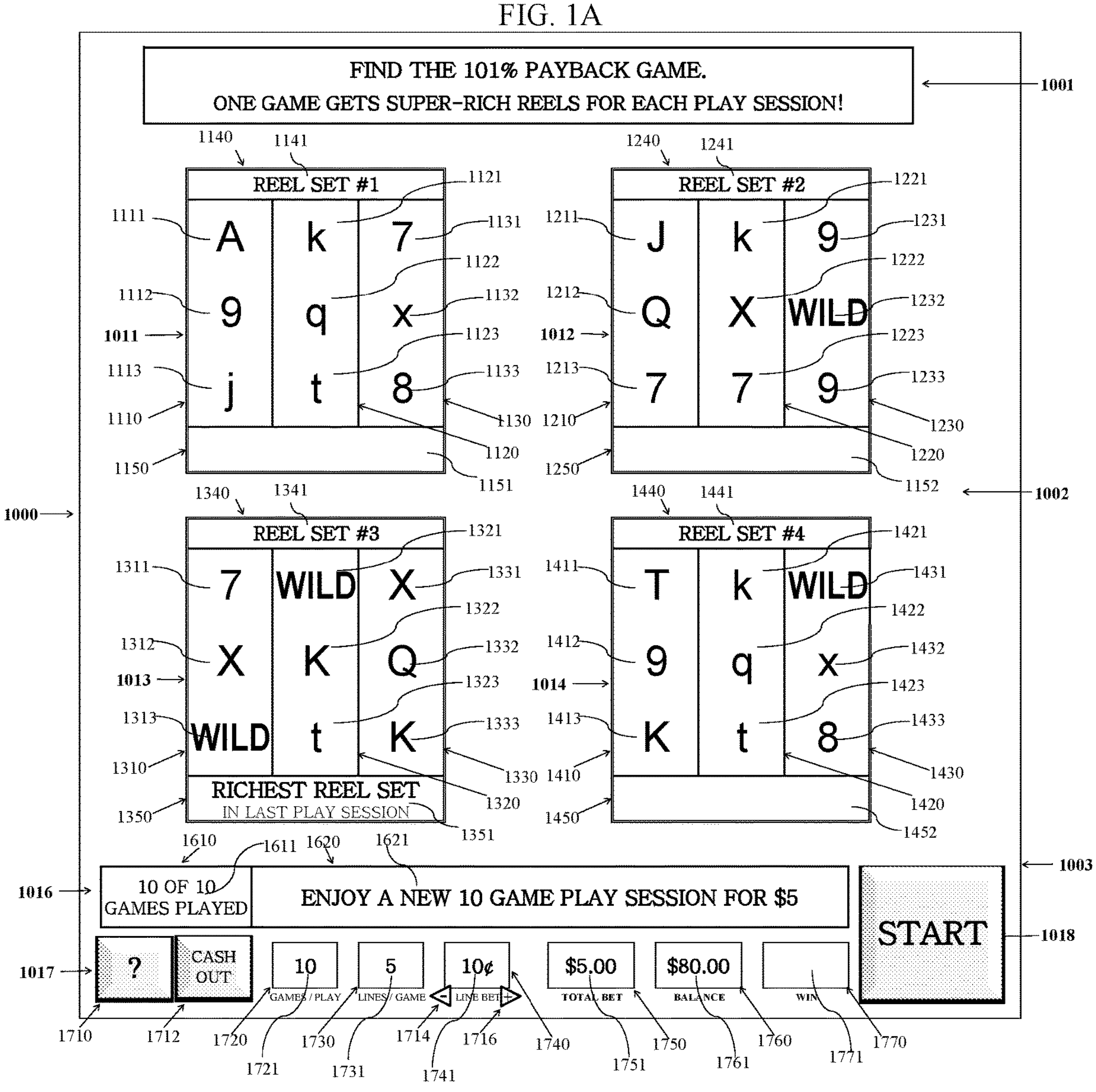
FIGS. 1A, 1B, 1C, 1D, 1E, 1F, 1G, 1H, 1I and 1J, illustrate wireframe examples of screen displays of different states of one embodiment of the present disclosure.

Within the present disclosure, a few terms are used which might have more than one interpretation relative to context and background. For the sake of brevity, the following terms are used in the present disclosure as follows.

The term "game" indicates a device, or sub-component of a device, and/or a process which is able to provide a complete gaming proposition, as in the generation, display and evaluation of a gaming outcome, including the update of any counts related to the number plays remaining and the display and awarding of any earned wins. For many examples in the present disclosure, the term "game", "game display area" and "reel set" are synonymous.

The term "reel set" indicates a slot-based game usually in a gaming device which offers a plurality of simultaneous games.

The term "play" as a verb, indicates that a device or gaming system provides complete gaming proposition of a single game. The term "play" as a noun, indicates the act of providing a complete gaming proposition of a single game.

The term "play session" means the time between the initiation of one or more games by the staking of a wager until conclusion of all available play.

The term "round" or "round of play" means the time between the initiation of one or more games by whatever appropriate means or condition and the conclusion of a play on each of the one or more game.

The term "multi-round" implies a play session in which at least two rounds of play are initiated. In most but not all circumstances, this implies that at least one game is played at least twice within the same play session.

The term "sub-round" is the same as "round" though is usually used in context with a "multi-round" play session.

The term "return to player" often referred to by the acronym "RTP" means the mathematically expected long-term player payback percentage of a gaming proposition. Within the present disclosure, RTP does not mean actual payback percentage. Actual payback percentage of a given gave is expected to converge to the mathematically expected long-term player payback percentage only after a sufficiently large number of plays.

In one embodiment, there are Nd=4 game display areas on which the player is given Np=12 plays for an initial staking of a total play session wager of $12. The awards generated from a single play of a single game display area are based on a $1 per play basis. Thus an outcome on such a single play that generates a 5× award will pay the player 5× time $1 or $5. When the player initiates play with a $12 total play session wager, Nm=4 different math models, each math having its own unique RTP, are randomly associated, without replacement, to the Nd game display areas. For example, for a specific initiation of play, math models with RTP values of 94%, 101%, 95%, and 90% are respectively associated with the 1st, 2nd, 3rd, and 4th game display area. If the player equally distributes play across the 4 game display areas, the corresponding effective RTP is average of the component RTPs or (94%+101%+95%+90%)=95%. If player uses all plays on a single reel set, the effective RTP is that of the math model associated with that reel set.

In some embodiments, the player has full control in terms of which available plays to use on which game display areas. In other embodiments, the gaming system requires at least one play on each game display area within the same play session. In some embodiments, one play is played on each of the game display areas exactly once in the initial sub-round of play. In some variations, the sub-round of play wherein each of the game display area receives one play is the first round of the play session. In some variations, the playing of each game in the game display area within the same sub-round occurs sequentially, such that the reels in the nth game display area does not start spinning until all the reels in the nth−1 game display area have finished spinning. In some other variations, the playing of each game in the game display area within the same sub-round starts concurrently but resolves sequentially or semi-sequentially, following the choreography typically found in existing slot games with multiple game display area such as by having all the reels in all the game display areas start spinning within the same second and then stop spinning sequentially such that the first reel in nth game display area doesn't stop spinning until the last reel of the nth−1 game display area has stopped spinning. In some other variations, the playing of each game in the game display area within the same sub-round occurs concurrently, where each game display area starting its reel spins at the same or approximately the same time, and where each game begins displaying final its final outcome at the same time or at approximately the same time.

In some embodiments, especially on devices which include a small screen display area such as mobile devices or smart phones or PDAs, the game display area may change appearance and/or location on the display device. For example, in some embodiments, all of the Nd=4 display areas are initially displayed simultaneous. When a given game display area is to be played, the game display area grows in size for improved visibility, perhaps taking up most or all of the space on the display, until the play is complete. Though a play on any of the game display area can expand into a common area on the display, the player is able to visually associate the full-screen display of a game display area with its minimized display. Such association may be made easier for the player by the use of distinctive visual elements such as a unique border and/or background color for each game display area and/or unique symbol are for each game display area, and/or some other type of distinguishing mark such as a unique title, for example "Fall", "Winter", "Spring", and "Summer".

In some embodiments, the player has only one opportunity to select which display area is to receive subsequent play. For example, after each of the Nd=4 game display areas have been played once, the player is prompted to select which game display area is to receive all subsequent plays available in the current round of play. Once selected, these subsequent plays are played automatically. For example, after each of the Nd=4 game display areas have been played once, the player is prompted to select which game display area is to receive the next available play and is prompted again after each subsequent play until all plays available in the round have been played. In another variation, after each of the Nd=4 game display areas have been played once, the player is prompted to select which game display area is to receive the next j number of plays from the remaining k number available plays in the round. For example, for a game with Np=12 total games and Nd=4 game display areas, after each of the Nd=4 game display areas have each received one play, the player is prompted to select one of the Nd=4 game display areas to receive the next 4 play of the available 8 plays remaining in the round. After these four plays have been played on the game display area chosen by the player, the player is again prompted to select one of the Nd=4 game display areas to receive the final remaining four plays. Based on the rules of the game, the player may or may not be allowed to select the same game display.

In some embodiments, when the player is prompted to select a game display area to receive additional play, the player is also offered the choice of having the remaining plays distributed amongst all the game display areas. In some variations, the player only has a limited time in which to make a selection. If no selection is made within that time period, a default selection is made for them. In some variations, the default selection is the same as the last selection made in the game, whether by the current player, or by a previous player, or by initial game launch. In some other variations, the default selection is to distribute the plays amongst all the game display areas.

In another embodiment, there are Nd=4 game display areas on which the player is given either Np=20 plays or Np=24 plays for an initial staking of a total play session wager of $24. For each play in a given game display area, the effective wager for that play will either be $1 or $2. The awards from a play of a game with a $2 wager are twice as large as awards from a play of the same game with a $1 wager. When the player initiates play with a $24 total play session wager, Nm=4 different math models, each math model having its own unique RTP, are randomly associated, without replacement, to the Nd=4 game display areas, and then the first round of play is initiated.

For the first round of play, each of the Nd=4 game display areas is played with an effective wager of $1. After the first sub-round of play has concluded, the player is given the option to select one of the Nd=4 game display areas to be subsequently played with an effective wager of $2 for four more plays, while all other game display areas will be played with an effective wager of $1. In some variations, this selection applies to all remaining sub-rounds of play. In some other variation, the player is able to change his or her selection in between sub-rounds.

In some variations, the player is initially also given the option to instead play five more rounds of play with all of the game display areas assigned an effective bet of $1. In some variations of embodiments with this no-$2-play option, the choice to play all remaining plays at $1 becomes the default choice if the player does not make an explicit selection within the initial query timeframe. In some variations of embodiments with this no-$2-play option, the game display last selected to be assigned a $2 wager, whether by the current player, or by a previous player, or by initial game launch, becomes the default choice if the player does not make an explicit selection within the initial query time-frame.

In another embodiment, the player places Nw=5 number of wager units, one play session at a time, to play on Nd=4 game display areas, where Nw>Nd, and where at least on unit of wager is required for a play on any game display area. At some point since game launch or initial game start up, but prior to wagering, Nm=4 different math models, each math having its own unique RTP, are randomly associated, without replacement, to the Nd game display areas. At some point in the future, the random assignment of math models to game display areas will occur again. In some variations, this new assignment is allowed to be the exactly same as the prior assignment. In some other variations, this new assignment is constrained to not be exactly the same as the prior assignment. The system initiates a new random assignment of math models to game display areas based on any number of suitable events, such as but not including: (a) fixed number of rounds of play completed; or (b) a randomly selected number of rounds of play completed; or (c) a fixed amount of time has elapsed since the last assignment; or (d) a randomly selected amount of time has elapsed since the last assignment; or (e) a certain game outcome occurs on any game display area or (f) a certain series of game outcomes occur on any game display area; or (g) a certain series game outcome occurs on any of the same game display area; or (h) a certain series of game outcomes occur on any of the same game display area; or (i) a certain series game outcome occurs on particular explicitly designated game display area; or (j) a certain series of game outcomes occur particular explicitly designated game display area; or (k) a certain game outcome occurs on particular game display area not explicitly identified, such as the game display area to which the math model with the highest RTP is assigned; or (l) a certain series of game outcomes occur on particular game display area not explicitly identified, such as the game display area to which the math model with the highest RTP is assigned; or (m) a certain number of one or more specific outcomes has occurred since the last assignment; or (n) the player has changed his or her base wager size; or (o) the player has changed his or her sidebet wager size; or (p) a certain amount of time has elapsed since the conclusion of the prior game; or (q) player has ended his or her play session by cashing out or logging out or losing their network connection or deactivating a loyal club card or by reaching a balance of zero or by maintaining a balance of zero for a particular amount of time; or (r) player has received an award of a certain value or higher; or (s) player has accumulated awards since the last reassignment, the sum of which are of a certain value or higher or (t) a certain number of rounds have been played with the higher wager designated for the game display area to which the math model with the highest RTP is assigned; or (u) a certain number of rounds have been played with the higher wager designated for the game display area to which a math model other than the math with the highest RTP is assigned; or (v) any other suitable mechanism; or (w) any combination thereof.

Continuing with the prior example, one of the Nd=4 game display area is assigned a larger wager ($2) than the wager ($1) assigned to each of the other game display areas. The player is able to select or change which of the Nd=4 game display areas is to be assigned the larger wager. In some variation, this selection can be made or changed at the start of any round of play. In some other variations, this selection can only be made at only certain rounds of play, such as, but not limited to: (a) after every Nr number of rounds of play; or (b) after a particular outcome occurs; or (c) after the assignments of math models to game display area are updated by the system; or (d) any other suitable mechanism; or (e) any combination thereof.

For each play in a given game display area, the effective wager for that play will either be $1 or $2. The awards from a play with a $2 wager are twice as large as awards from a play with a $1 wager. When the player initiates play with a $24 total play session wager, Nm=4 different math models, each math having its own unique RTP, are randomly associated, without replacement, to the Nd game display areas, and then the first round of play is initiated.

In some embodiments, there are an equal number of Nm math models and Nd number game display areas, so the association of one to the other can be accomplished by simple random shuffle. In some embodiments, there are more math models available than game display areas, so the association of math models to game display areas can be accomplished by random selection, such as with or without replacement, and with or without weighting. In some embodiments, there are fewer math models available than game display areas so the association of math models to game display areas can be accomplished with random selection such as with replacement and with or without weighting; or such as randomly assigning one of each type of math model to one game display area and then randomly assigning math models to all remaining game display areas; or such as randomly assigning one of each type of math model to one game display area and then assigning a particular math model, for example, the math model with a particular RTP, to all the remaining game display areas. In some variations, the number of math models Nm=2 where one the math model offers a higher RTP than the other.

In some embodiments, a second math model which is to provide higher payback relative to a first math model is dynamically created. For example, the second math model can be constructed from a copy of the first math model but with alternate reel strip stop weightings, such as increase the reel strop weights for one or more positions on which a wild symbol and/or other high paying symbol appears. In another example, for an implementation with video-based reel strips, the second math model can be constructed from a copy of the first math model but with alternate symbols, such as by the addition and/or substitution of one or more wild symbols and/or high paying symbols. In some variations, the gaming system follows certain construction rules such as to prevent the addition of certain symbol too vertically close to one or more specified symbols, or such as to prevent certain symbols such as bonus trigger symbols or jackpot symbols or any specified symbol from being substituted out.

In some embodiments, there are two or more sets of math model assignments, of which one is selected for a given session of play. In some variations, the assignment of math models from a selected set to the game display area is randomized, such as by shuffling. In other variations, no such randomization occurs after a set of math models is selected. There are numerous ways in which a set of math models can be selected for a given series of plays such as: (a) randomly selected with uniform weighting; (b) randomly selected via weighted selection; (c) randomly selected without replacement between game series; (d) randomly selected without replacement between game series; (e) selected in a round-robin fashion; (f) selected by any other suitable means; and/or (g) selected by any combination of methods.

In bingo-based Class II implementations of the present disclosure, the assignment of a target RTP to a given game display area is accomplished by the assignment of a set of outcome mapping tables that generates such an RTP. In pull-tab based Class II implementations of the present disclosure, the assignment of a target RTP to a given game display area is accomplished by the association of an outcome pool the RTP of entire said pool being that of the target RTP.

In some embodiments, the RTP of the math model associated with each game display area is revealed to the player after all available plays have been used. In some embodiments the relative ranking of RTP values is revealed to the player. In some embodiments the game display area with the highest RTP is identified. In some embodiments the game display area with the lowest RTP is identified.

In some embodiments, some RTP-related information about particular game display area is revealed to the player before all available plays have been used. In some embodiments, a particular ranking is revealed, such as the game display area that has the lowest RTP. In other embodiments, a game display area is randomly selected for RTP value and/or RTP ranking information display. In some variations, the player is able to select which game display area's RTP information is to be revealed. In some variations, the number of plays used before the RTP of a game display is revealed is a fixed number based upon the rules of the game. In some variations, the number of plays before the RTP of a game display is revealed is based upon one or more game outcomes such as by getting a certain number of losing outcomes in a row.

In some embodiments, the reel spin display can vary between associated math models, thus careful viewing of the reel spins as they occur can provide a given player a clue as to the relative RTP. For example, in one embodiment, the reel set displayed for the highest RTP math model has four contiguous wild symbols on the third reel whereas the other math models have three or fewer contiguous wild symbols on the third reel.

In embodiments where the reel display does not vary between associated math models, such as with an electromechanical slot, or where the player cannot discern variation, a player may be able to discern relative math model RTP based on outcomes. For example, a player who initially uses one play on each of the 4 game display areas and observers one medium-sized outcome, two small-sized outcomes and one non-winning outcome might reasonably assume that the game display area that produced the medium-sized outcome is the one to which the math model with the highest RTP has been assigned.

In a video reel implementation of the present disclosure where the reel spin display is meant to vary between at least two math models, standard reel spin display techniques can be applied. For example, for implementations involving reel spin animation that do not exactly match the reel strips from which the outcome is generated can use a primary reel spin animation for game display areas associated with a primary math model and a secondary reel spin animation for game display areas associated with a secondary math model. For implementations involving reel spin animations of reels that exactly match the reels used for outcome generation, can use a primary reel spin animation based on a primary reel set for game display areas associated with a primary math model and a secondary reel spin animation based on a secondary reel set for game display areas associated with a secondary math model.

The present disclosure also introduces novel systems and methods for reel spin display that allows all game display areas to use the same animation assets while still allowing players to be able to see differences in reel spin display between differing math models. This provides additional security in a client-server implementation such as a game played on the Internet or on a mobile device. Specifically, since the server does not directly communicate to the client which reel strip assets to use, such communication cannot be discovered by a player who is able to monitor incoming network communication to their client device.

In some embodiments of the present disclosure, the reel spin display mechanism for each displayed reel strip incorporates a conglomeration of all the reel strips used in the generation of the outcomes from every available math model. In some variations, the reel strip used for the generation of a particular math model is incorporated contiguously. In some variations, the reel strip used for the generation of a particular math model is incorporated in a noncontiguous section. In some variations, the reel strip display for a given reel is comprised only of sections found in one or more of the corresponding math models. In other variations, the reel strip display for a given reel is comprised of sections not found in any of the corresponding math models. Sometimes referred to as "salt", such display reel strip sections that are not present in any game outcome reel can provide filler between regular display reel strip sections that do match one or more math model outcome generation reels in order to improve obfuscation of the display reel strip configuration. This can be especially important in video reel slot games that are often accessed with a uniformly random selection so as to not make it easy for the math to be copied by a competitor.

In some embodiments, the game outcome determination for a given math model in the server is communicated to the corresponding game display area the final reel strip stop index for each reel strip. In some embodiments, the server communicates to the corresponding game display area the initial reel strip start index at which the reel display animation is to commence for each reel strip. In some embodiments, the server communicates to the corresponding game display area the reel strip index at which the final reel display animation prior to the display of final symbols is to commence for each reel strip. In some embodiments, the server communicates to the corresponding game display area specification as to when switch from initial symbol spin display animation to final spin animation.

In some embodiments of the present disclosure, the player places real currency wagers. In some embodiment, the player places virtual currency wagers. In some embodiment, the player places wagers based on points or other enumerable units. In some embodiment, the player is awarded real currency prizes. In some embodiment, the player is awarded virtual currency prizes. In some embodiment, the player is awarded points or other enumerable units. In some embodiments, the player is awarded a physical prize via a redemption process for items such as for a vehicle, via the dispensing of a token or ticket which can be exchanged for a physical prize, or via a direct award mechanism such as with a dispenser of coins, stamps, candy, toys, trinkets, etc., or via any suitable mechanism. In some embodiments, virtual currency and/or point or other enumerable units may be earned based on certain player activity and/or outcomes of said activity. In some embodiments, virtual currency and/or point or other enumerable units may lead to the awarding of a physical prize, a cash prize or a prize of some other form of value, whether by exchange and/or sweepstakes drawing and/or any other suitable form of prize determination.

Turning now to the figures, FIGS. 1A, 1B, 1C, 1D, 1E, 1F, 1G, 1H, 1I and 1J, illustrate wireframe examples of screen displays of different states of one embodiment of the present disclosure. Within each of these figures, the screen display area 1000 is comprised of three general areas, namely a marketing message display area 1001, a reel sets display area 1002, and a user interface area 1003. The marketing message area 1001 can be used for displaying art and information such the title of the game and/or messages that merchandise game features. The reel sets display areas 1002, is comprised of four of reel sets 1011, 1012, 1013, 1014. In some alternate embodiments not displayed, there fewer than four reel sets, such at two reel sets or three reel sets. In alternate embodiments not displayed, there are more than four reel sets, such as six reel sets or 12 reel sets or any practical number of reel sets.

Each of the reel set 1011, 1012, 1013, 1014 has some common components which shall be detailed using Reel Set #2 1012 as an example. Reel Set #2 is comprised of first message display area 1240 which can be used for reel set identification and/or for other information, a reel strip display area 1220 and a status message area 1250 which could also function as a marketing message area if so implemented. The reel strip display area contains 3 displayed reel strip segments 1210, 1220, 1230. The left-most reel strip 1210 in Reel Set #2 1012, contains 3 final symbol display positions, 1211, 1212, 1213. The center reel strip 1220 in Reel Set #2 1012, contains 3 final symbol display positions, 1221, 1222, 1223. The right-most reel strip 1230 in Reel Set #2, contains 3 final symbol display positions, 1231, 1232, 1233. In an alternate embodiments not shown, there are more than three reels strips per reel display area, such as four reel strips or five reel strips or six reel strips or any practical number of reel strips. In alternate embodiments not displayed, there are fewer than three symbols per displayed reel strip segment such as one symbol or two symbols. In alternate embodiments not displayed, there are more than three symbols per displayed reel strip segment such as four symbols or five symbols or any practical number of symbols. In alternate embodiments not displayed, there is more than a single reel strip segment display per reel strip display area column. For example, popular slot machine games such as IGT's Treasures of Troy™ display a rectangular grid of symbols, each symbol being sourced from its own reel strip. For example, in the Treasures of Troy™ game, there are 20 symbol position arranged in a 3-high, 5-wide arrangement, the symbols displayed during reel spins and the final symbol displayed are independently selected from each of 20 reel strips which may or may not be identical to any other reel strip in the same game.

Not explicitly displayed in any of the reel strip display area, but implied by example and practice, are paylines (sometimes also referred to as "pay lines", "payout lines" or "lines") which define the position patterns used in outcome determination. Each of the paylines is associated with a different plurality of the symbol display areas. In Reel Set #2, for example, has five paylines which includes a payline comprised of the symbol positions along the center row 1212, 1222, 1232; and a payline comprised of the symbol positions in along the top row 1211, 1221, 1231; and; and a payline comprised of the symbol positions along the bottom row 1213, 1223, 1233; and a payline comprised of the symbol positions along the descending diagonal 1211, 1222, 1233; and a payline comprised of the symbol positions along the ascending diagonal 1213, 1211, 1231. Other embodiments not covered by example include fewer paylines, such as three payline or five paylines, or more paylines up to any practical number. Other embodiments not covered by example include paylines comprised of more than 3 symbols. Other embodiments not covered by example include games with winning patterns other than paylines such as scatter pays such as the bonus trigger for the IGT Cleopatra™ slot game, or such as Reel Power pays found in the Aristocrat Buffalo™ slot game, pays based only on numeracy of adjacency such as Konami's Eleven Pearls™ slot machine or the IGT online game Bubble Craze™, or any other type of evaluation.

In the current example, the reel sets all offer the same game which includes, for example, the same types of symbols available on the reel strip, the same paylines, the game rules, and the same paytable. In some alternate versions not displayed, a first reel set can offer a different game than a second reel set. For example, in one embodiment, the four reel sets respectively offer the game titles, Wolf Run™, Dessert Spirit™, Lil' Lady™, and Red Mansions™, said game titles offering very different looking symbols and background art though otherwise can be set up to provide equivalent games. For example, in one embodiment, the four reel sets respectively offer the game titles, Cleopatra™, Cleopatra II, Pharaoh's Fortune™ and Pharaoh's Fortune 2™, said game titles offering very different looking symbols and background art, and paytables, and game rules and potentially different payline configurations. In some embodiments not shown, one or more of the reel sets can be played individually as a stand-alone game. In some variations, these are slot games or other kinds of games within a digital casino.

Returning to the examination of the reel set general components, specifically the user interface area 1003, there are numerous sub-components as may be found in many slot games including a message display area 1016 which in this example is apportioned into a status display area 1611 and a marketing and general message area 1620, an array of inputs and information displays 1017, and a game initiation button labeled "START" 1018, which is some alternate embodiments is labeled "SPIN" or "PLAY" and/or which, in some alternate embodiments, might also display the total wager amount in said button. The status display area 1611 within the overall messaging display area 1016 can be used, for example, to indicate information such as the number of game remaining in the current play, and/or the number of free spins available in a free spins bonus. The array of inputs and information display 1017 is comprised a number of input buttons including an input button labeled "?" 1710 to display paytable and/or game rules, and an input button labeled "CASH OUT" 1712 to remove any credits remaining in the game/game machine, and a left-arrow-shaped button labeled "–" to reduce the bet, and a right-arrow-shaped button labeled "+" to increase the bet. The array of inputs and information display 1017 is comprised a number of information displays a numeric display labeled "GAMES/PLAY" which indicates the number of games available for play per play session, and a numeric display area labeled "LINES/GAME" which indicates the number of paylines per Reel Set, and a numeric display area labeled "LINE BET" which indicates the standard amount wagered per payline per reel set, and a numeric display area labeled "TOTAL BET" which indicates the totality of the wager for the current play session in progress, or for the next play session, and a numeric display area labeled "BALANCE" which indicates the totality of the currency available for wagering, and a numeric display area labeled "WIN" which indicates the amount of current or previous total winnings. In alternate embodiments not displayed, which are implemented on a physical slot machine device, any or all of these kinds of input button may be alternately or additionally implemented via physical buttons. In alternate embodiments not displayed, which are implemented on a physical slot machine device, any or all of these kinds of input button may be alternately or additionally implemented via one or more display devices other than the display screen on which the game field appears.

In other embodiments not included, values displayed for wager amounts, win amounts, and/or balance are represented in a form other than actual currency, such as in "credits" that are the equivalent of some denomination of actual currency, or such as in a virtual currency, or such as in any suitable units.

FIG. 1A illustrates an example game system state wherein the any prior game play is completed and there are sufficient credits in the balance to place a wager. Marketing and general message area 1620 of the user interface area 1016 displays the message "ENJOY A NEW 10 GAME PLAY SESSION FOR $5" 1621, which inform prospective players of the proposition being offered. The "$5" listed in said message 1621 corresponds to the cost of ten Games/Play Session*five lines per game*ten cents per line. There is also a "$5.00" value displayed 1151 in the display area which shows Total Bet amount 1750.

Figure 1B:
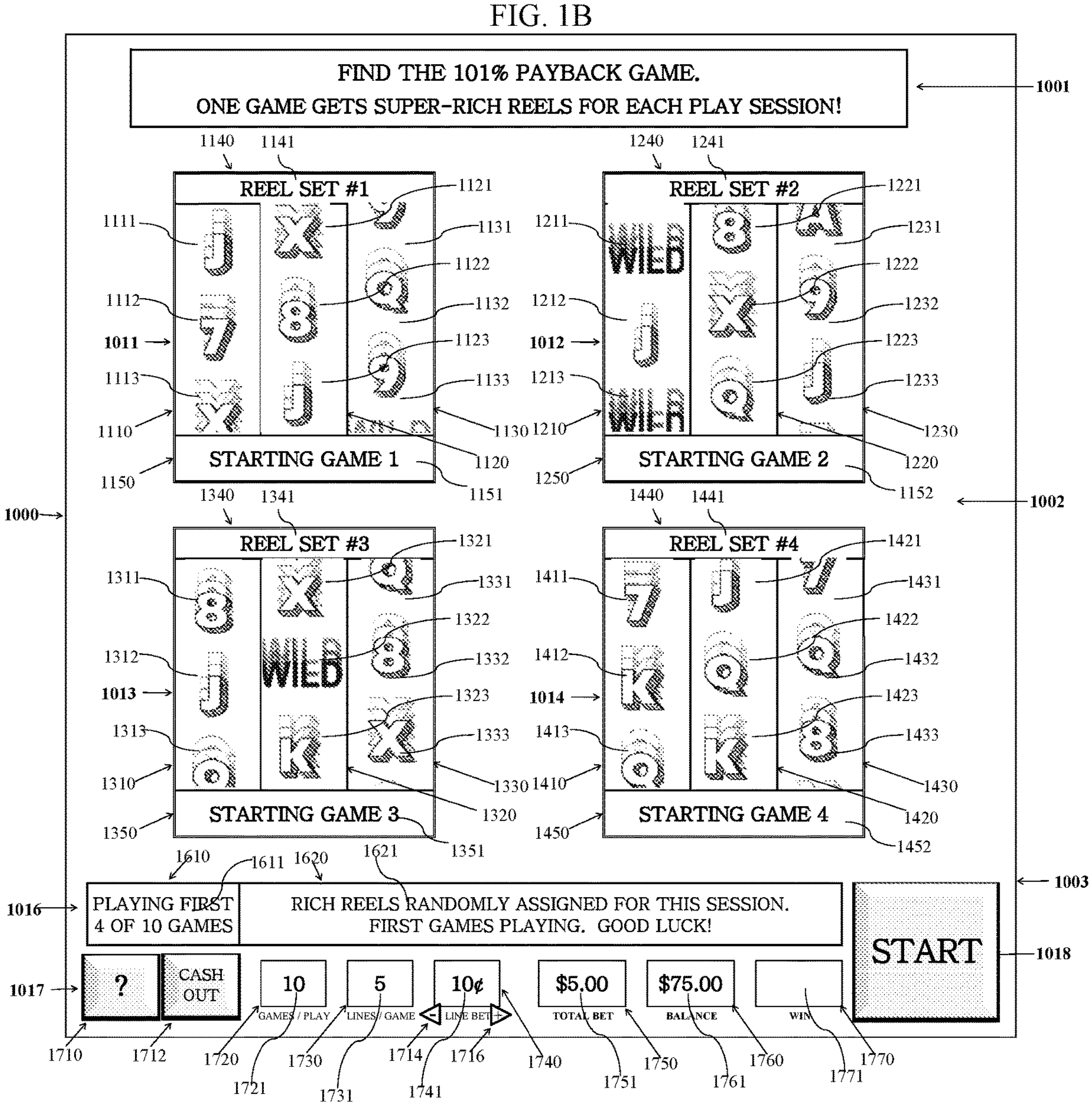

FIG. 1B illustrates an example game system state shortly after the player has initiated the first sub-round of play. Since the value shown in the Balance meter display 1760 is "$75.00" 1761, this would consistent with a "$5.00" value displayed 1151 in the display area which shows Total Bet amount 1750 having been subtracted from the Balance shown in FIG. 1A of $80.00 1761. The status display portion 1610 shows the message "PLAYING FIRST 4 OF 10 GAMES" 1161 which communicates to the player that the spinning of reels in each of the reel set 1011, 1012, 1013, 1014, is what the gaming system refers to in messaging which uses the term "game". This is further communicated by the messages "STARTING GAME 1" 1151, and "STARTING GAME 2" 1251, and "STARTING GAME 3" 1351, and "STARTING GAME 4" 1452, in the status message area 1150, 1250, 1350, 1450, at the bottom of each reel set 1011, 1012, 1013, 1014. The marketing message and general message area 1620 displays the message "RICH REELS RANDOMLY ASSIGNED FOR THIS SESSION. FIRST GAMES PLAYING. GOOD LUCK!" 1621 not only also communicates the meaning of a "game", but also communicates that a random assignment of math models has occurred.

The illustration on each of the reel strip segments 1110, 1120, 1130, 1210, 1220, 1230, 1310, 1320, 1330, 1410, 1420, 1430, is meant to indicate that the symbols on said reel strip segments are seen spinning downwards. Relative to the specific implementation, the reel spins may provide players with clues as to the relative richness of the reel sets. In this example, the appearance of two "WILD" symbols 1211, 1213, on the same reel strip segment 1210 of Reel Set #2 1012 could indicate that at least one additional WILD symbol has been inserted into the reel strip corresponding to that reel strip segment 1210 thus implying that the math model assigned to Reel Set #2 1012 is richer than average. Such an observation could be considered as definite proof of Reel Set #2's higher RTP if it were known that the close vertical placement of WILD symbols was not present in reel sets not associated with the highest RTP and that the game system achieves higher than average RTP by the random insertion of WILD symbols into the standard reel strips and/or the replacement of symbols on a standard reel strip by a WILD symbol.

Figure 1C:
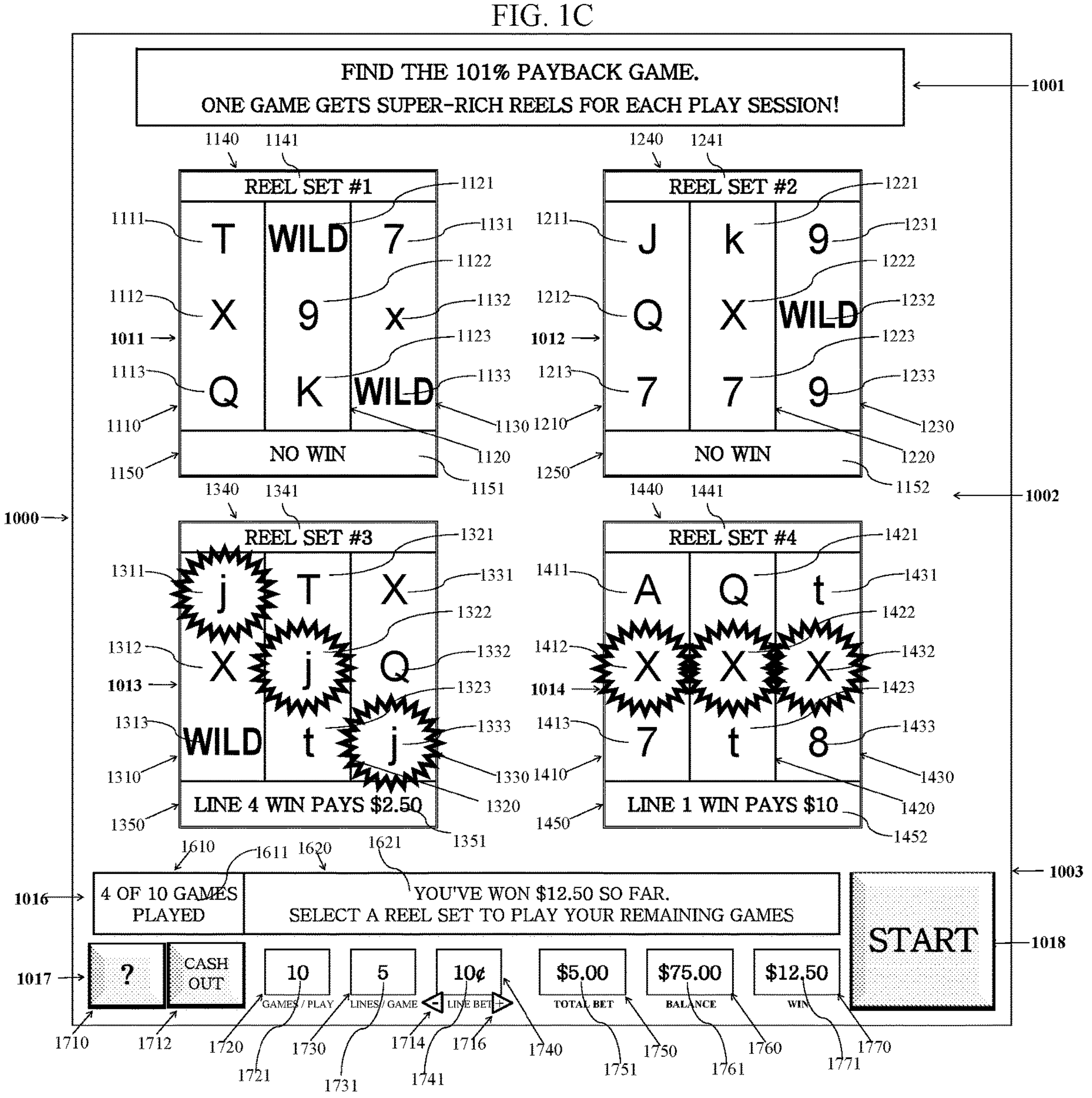

FIG. 1C illustrates an example game system state after the completion of the initial sub-round of play on each of the four reel sets 1011, 1012, 1013, 1014. The status display portion 1610 shows the message "4 OF 10 GAMES PLAYED" 1161 which communicates that the initial sub-round of play has used four of the ten games available in the entire round and thus that there are 10−4=6 games remaining in the play session. The marketing message and general message area 1620 displays the message "YOU'VE WON $12.50 SO FAR. SELECT A REEL SET TO PLAY YOUR REMAINING GAMES" 1621 is prompting the player to choose one of the four reel sets 1011, 1012, 1013, 1014 to play the remaining available games. The results of the initial games on the four reel sets 1011, 1012, 1013, 1014, are available for examination by the player. Within the status display area 1150, 1250, 1350, 1450, is a written description of the outcome, whether that be a non-winning outcome "NO WIN" 1151, 1251, or a winning outcome "LINE 4 PAYS $2.50" 1351 and "LINE 1 WIN PAYS $10" 1451. The winning outcomes are also highlighted on Reel Set #3 1013 and Reel Set #4 1014 by the visual emphasis, which include animation, on the symbols which comprise the winning outcomes, namely the "J" symbols along payline 4 1311, 1322, 1333, in Reel Set #3 1350 and the "X" symbols along payline 1 1412, 1422, 1432, in Reel Set #4 1450. The definition of what constitutes a winning outcome and award associated with said winning outcome is listed is a paytable such as displayed in FIG. 2.

At this point, players could concoct different justifications for the selection of any of the four reel sets 1011, 1012, 1013, 1014. For example, a given player could argue that Reel Set #1 1011 is likely the richest because it is the only outcome that shows an outcome with two WILD symbols 1121, 1133. Another player could argue that Reel Set #2 1012 is like the richest because of the presence of neighboring Wild symbols 1211, 1213 during the preceding reel spins in FIG. 2*b* as pointed out in an earlier section. Yet another player could argue that Reel Set #3 1013 is likely the richest because it is the only outcome which features a WILD symbol on the first reel, and it also features a medium-sized winning outcome. Yet another player could argue that Reel Set #4 1014 is likely the richest because it has the highest-paying outcome of any of the four reel sets 1011,1012,1013,1014.

Figure 1D:
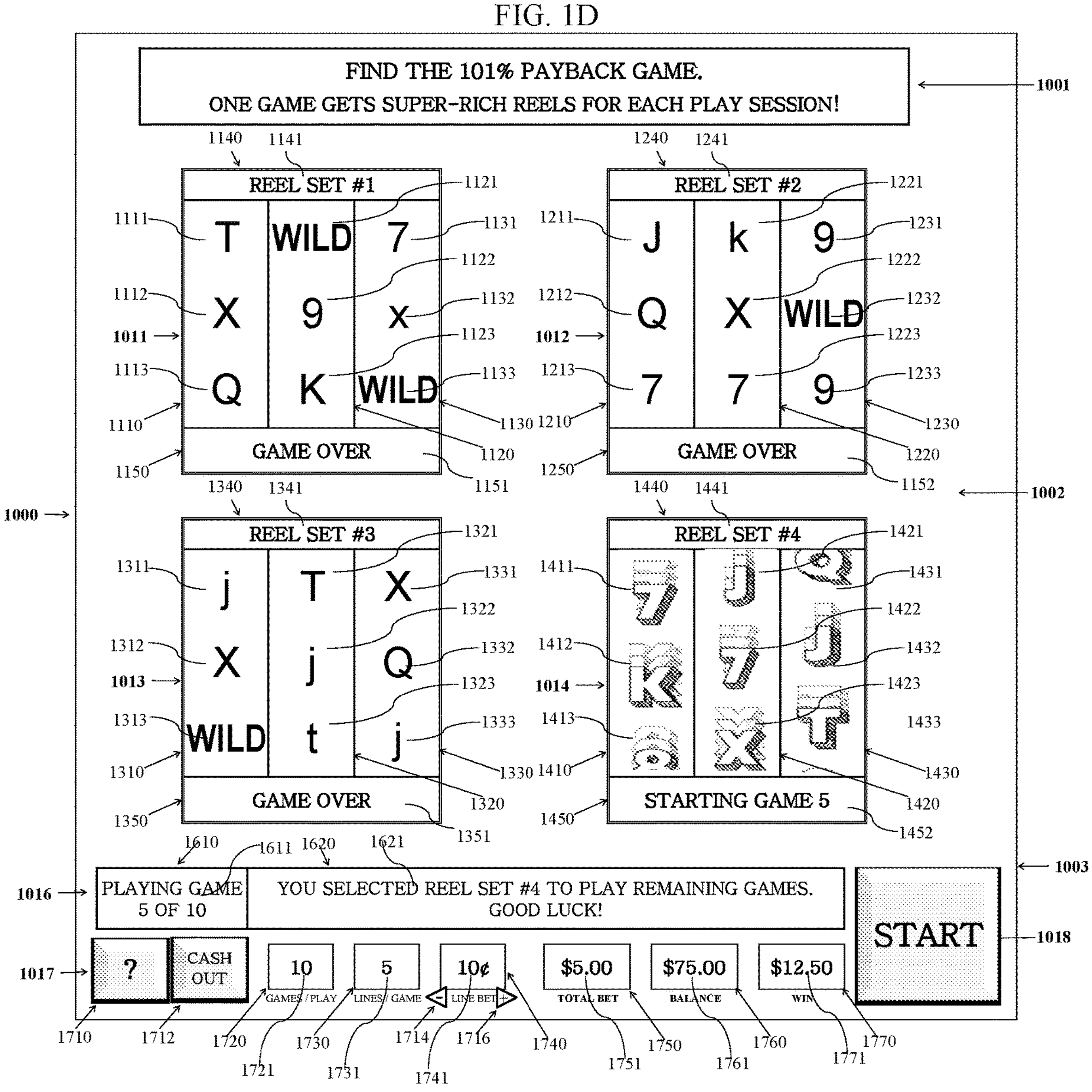

FIG. 1*d* illustrates an example game system state shortly after a player has selected Reel Set #4 1014 to receive all the plays remaining in the play session and the corresponding reels 1410, 1420, 1430 have started spinning. The status display portion 1610 shows the message "PLAYING GAME 5 OF 10" 1161 which communicates the current status. The marketing message and general message area 1620 displays the message "YOU SELECTED REEL SET #4 TO PLAY REMAINING GAMES. GOOD LUCK!" 1621 which provides acknowledgement and documentation of the player's selection. Though the spinning reels should make it obvious which of the reel set is active, the status display area 1450 of the player selected reel set 1014 displays the message "STARTING GAME 5" 1452, whereas the status display areas 1150, 1250, 1350 of the other reel sets 1011, 1012, 1013 each displays the message "GAME OVER" 1151, 1251, 1351 which indicates that said unselected reel sets are no longer active or eligible for play for the current play session.

Figure 1E:
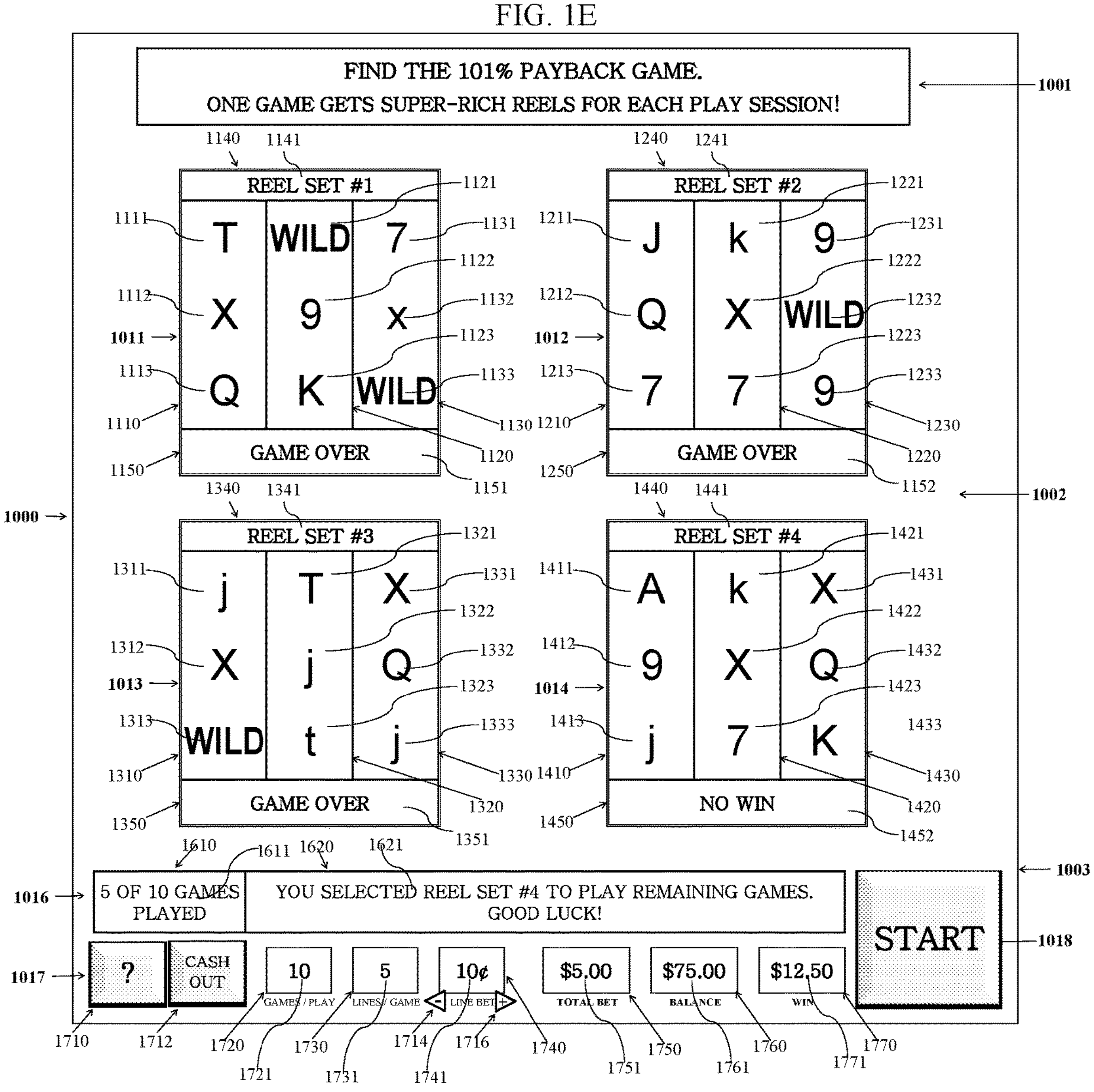

FIG. 1E illustrates an example game system at the end of a sub-round of play (in this case, at the end of game 5 of this example session) on a player-selected reel set (in this case, Reel Set #4 1014 selected) in which a non-winning outcome has occurred. The top first message display area 1440 has a different visual effect, such as highlighting, or brightening, that the other first message display areas 1140, 1240, 1350 do not have so as to indicate which is the active, selected reel set. The status display area 1450 of Reel Set #4 1140 displays the message "NO WIN" to fully clarify that the outcome is not a winner.

Figure 1F:
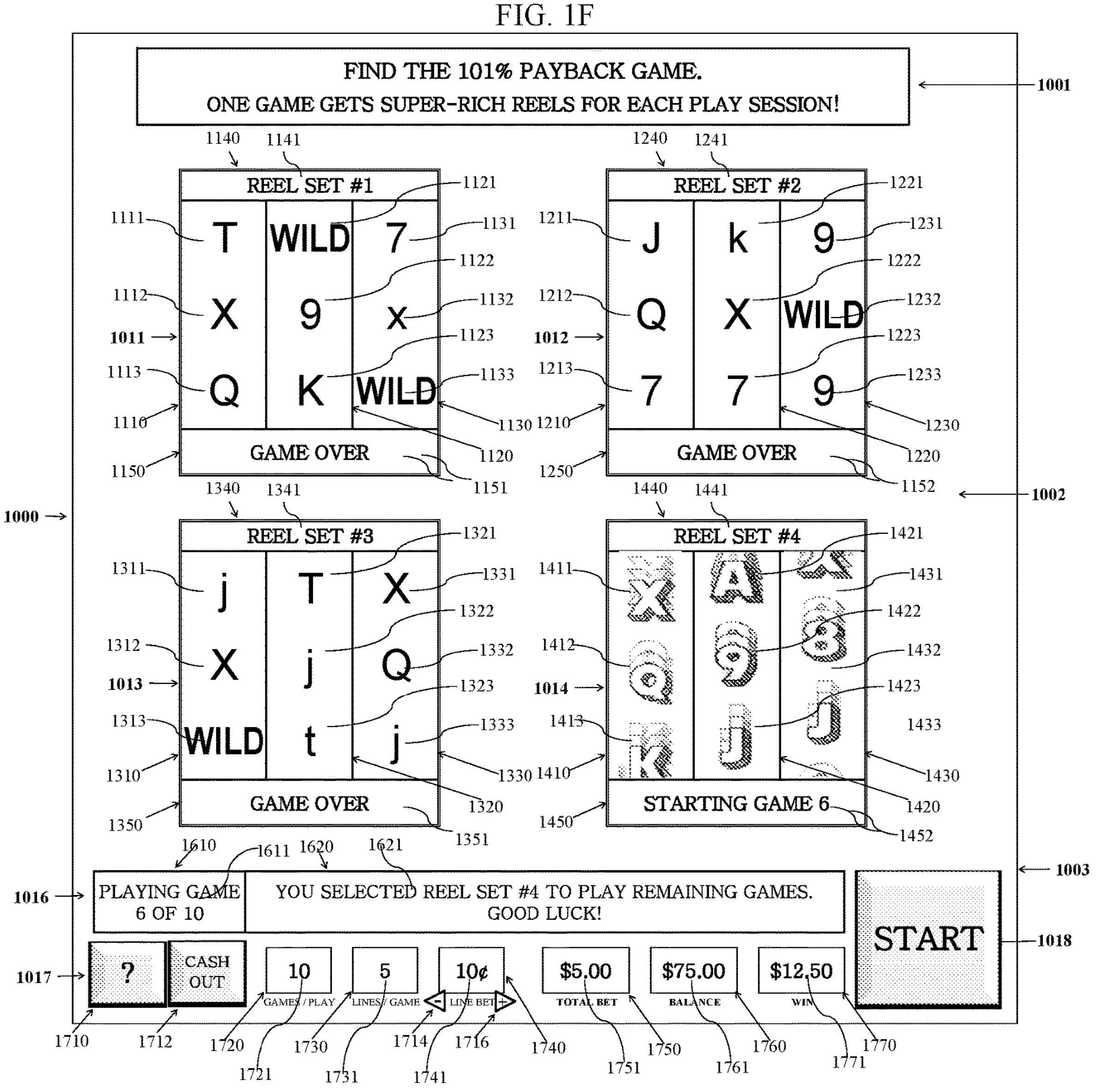
Figure 1G:
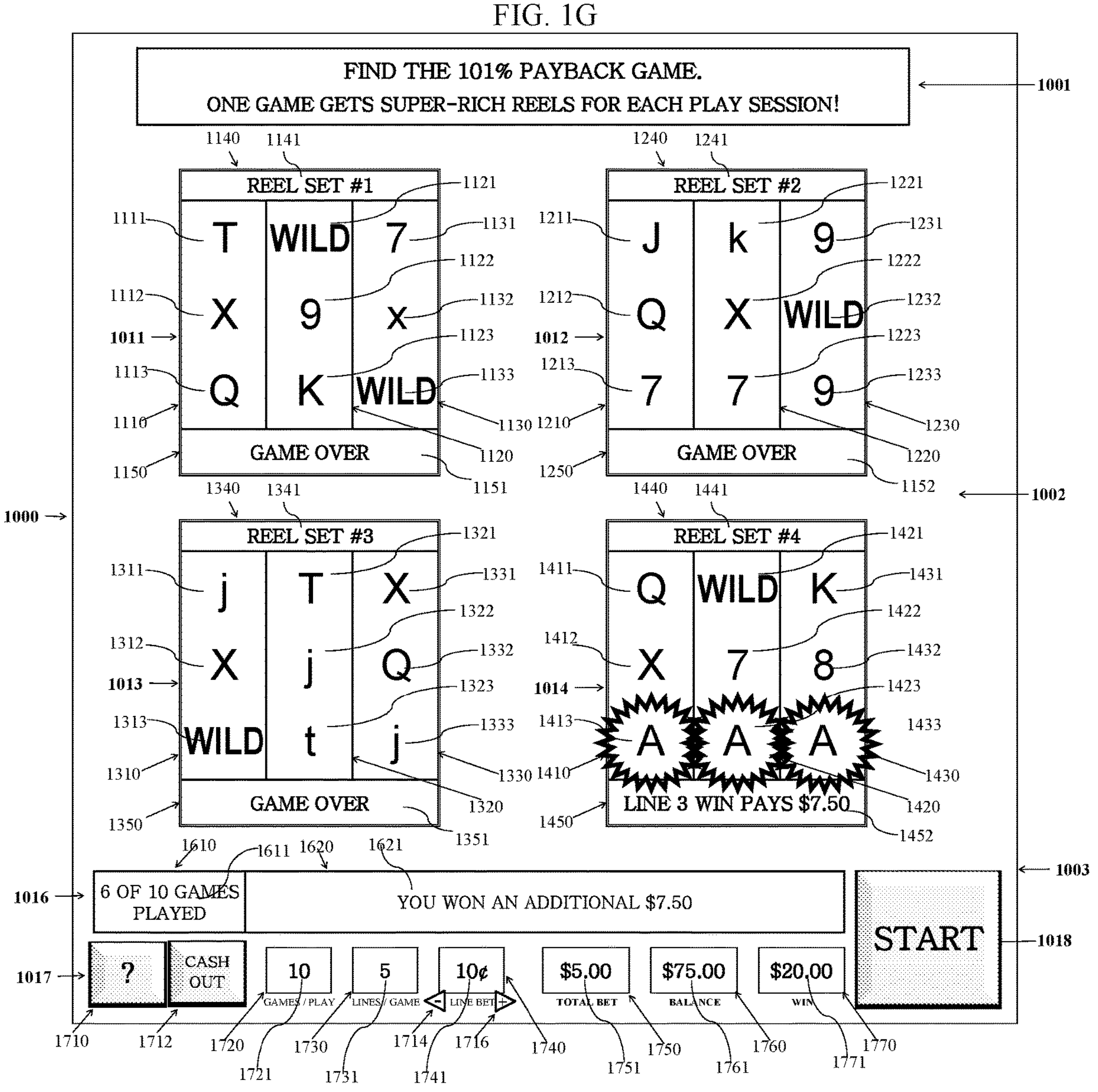
Figure 1H:
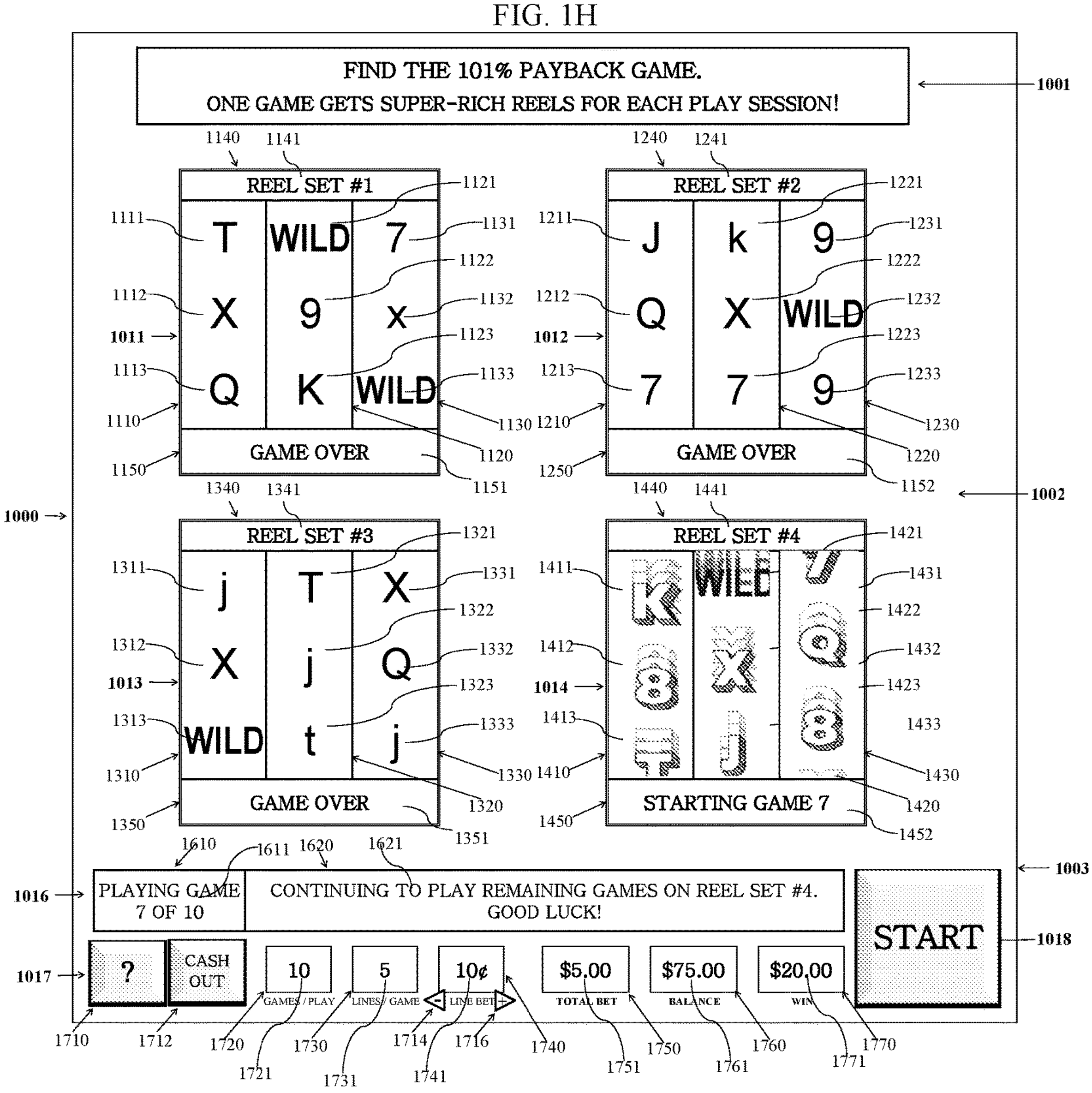

FIGS. 1F and 1H illustrates an example game system states shortly after the start of an intermediate sub-round (in this case, at the start of game 6, and the start of game 7, respectively, of this example session.) Not indicated is the automatic nature of each intermediate sub-round beginning play without any additional user input beyond the player's initial selection of the reel set to receive all the remaining plays. In some embodiments, the game system may cut short audio-visual effects being presented for certain winning outcomes, especially winning outcomes of a relatively large amount, based on the player providing any input such as pressing a button or pressing the display area.

FIG. 1G illustrates an example game system at the end of a sub-round of play (in this case, at the end of game 6 of this example session) on a player-selected reel set (in this case, Reel Set #4 1014 selected) in which a winning outcome has occurred. Similar to the winning outcomes displayed in FIG. 1C, the winning outcome in FIG. 1F is denoted by a highlighting or other visual emphasis of the "A" symbols along payline 3 1413,1423,1433 in Reel Set #4 1014 as well as verbal text "LINE 3 PAYS $7.50" 1452 in the status display and as well as verbal text "YOU WON AN ADDITIONAL $7.50" 1621 in the marketing and general message display area 1620.

Figure 1I:
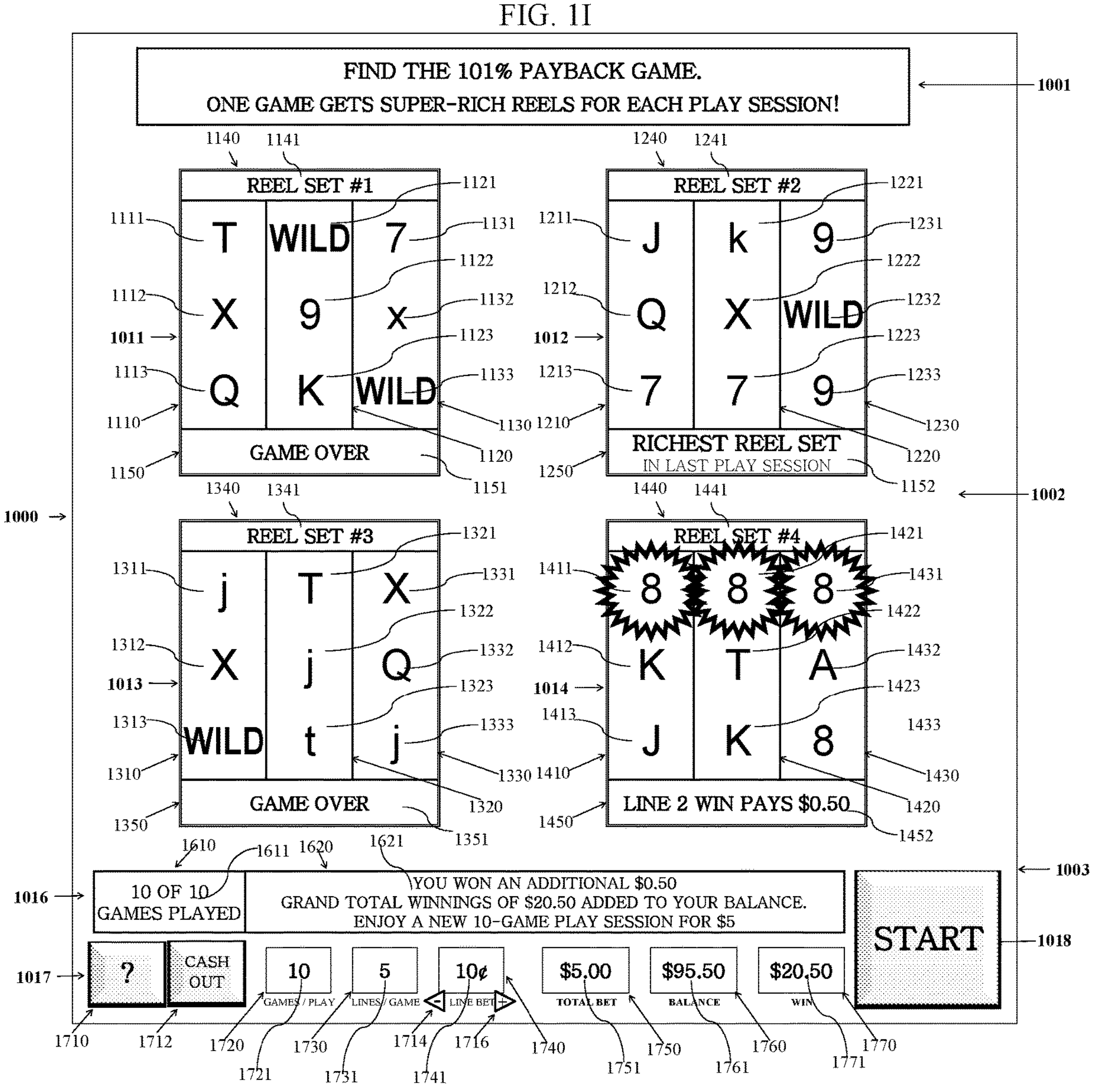

FIG. 1I illustrates an example game system at the end of a round of play in which at least one winning outcome was earned. The message "YOU WON AN ADDITIONAL $0.50. GRAND TOTAL WINNINGS OF $20.50 ADDED TO YOUR BALANCE. ENJOY A NEW 10-GAME PLAY SESSION FOR $5" 1621 displayed in the marketing and general message display area 1620 communicates several things: (a) the very last game of the play session awarded the player $0.50; and (b) the total winnings earn across the entire play session (which is also indicated in the Win display 1770); and (c) a prompt to wager on another play session. The first message display area 1240 of Reel Set #2 1012 displays the message "RICHEST REEL SET IN LAST PLAY SESSION" to inform the player which reel set was assigned the highest payback math model. This is done to satisfy player curiosity as to whether or not the highest payback reel set had been identified and to potentially provide guidance so that the player might be able to make more accurate selections in the future.

Figure 1J:
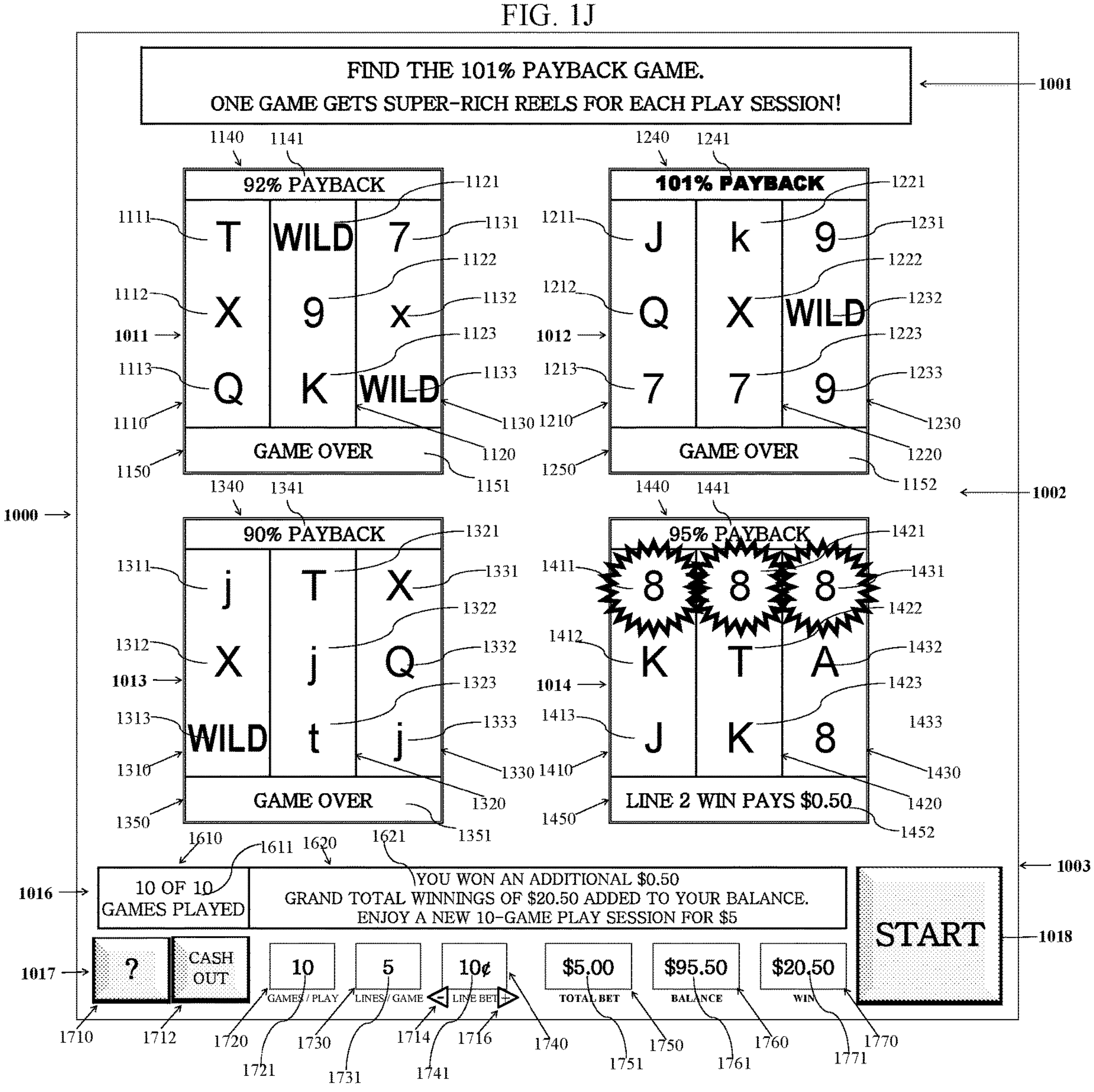

FIG. 1J illustrates an alternate example game system at the end of a round of play in which at least one winning outcome was earned. The primary difference between FIG. 1J compared to FIG. 1I is the means of communicating the assignment of math models to reel sets. In FIG. 1J, the first message display area 1140, 1240, 1340, 1440 of each of the reel sets 1011, 1012, 1013, 1014 indicates the payback of the math model "92% PAYBACK" 1141, "101% PAYBACK" 1241, "90% PAYBACK" 1341, "95% PAYBACK" assigned to each reel set during the last play session. In some embodiments not specifically shown, the set of math model paybacks assigned to reel sets is the same from play session to play session. In some embodiments not specifically shown, the set of math model paybacks assigned to reel sets may vary from play session to play session based on random selection or any other suitable means. In some alternate embodiments not shown, some of the reel sets were assigned the same payback percentage. In some alternate embodiments not shown, one of more payback ranking message are displayed such as from a set of messages such as: "RICHEST PAYBACK", "HIGHER PAYBACK", "HIGH PAYBACK", "AVERAGE PAYBACK", "STANDARD PAYBACK", "LOWER PAYBACK", "LOW PAYBACK", "LOWEST PAYBACK", or any other suitable message.

Figure 2:
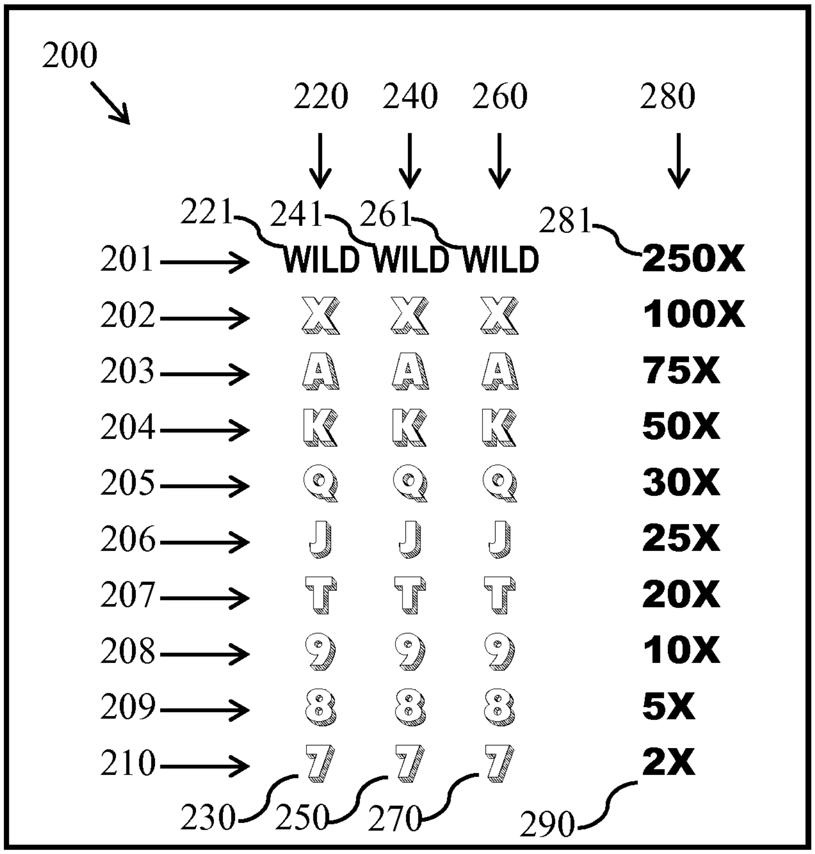
FIG. 2 illustrates a slot-game paytable.

FIG. 2 illustrates an example slot game paytable (sometimes referred to as "pay table", "payout table", "payout schedule", etc.) 200 as could be used in prior examples. The table is comprised of 10 rows 201, 202, 203, 204, 205, 206, 207, 208, 209, 210, of pay outcomes. The first three columns of each row 250, 260, 270, illustrates the symbol pattern defined for the pay outcome. The fourth column 280 represents the award multiplier awarded for the defined pay outcome. For example, for an outcome where three "WILD" symbols 251 align on the same active payline, an award of the line bet wagered on that payline times a prize of "250×" 281 is paid to the player. Not displayed is the game rule which indicates that the WILD symbol can substitute for any other symbol for evaluation purposes. For example, an outcome with one "7" symbol 230 and two "WILD" symbols 221, or an outcome with two "7" symbols 230 and one "WILD" symbol 221 that align along the same active payline, would be evaluated by the gaming system as a three "7" symbol 221 winning outcome 210. Also not displayed is the game rule which states that only the highest winner is paid. So for example, even though a three "WILD" symbol 230 outcome could be evaluated as a three "7" symbol outcome, and as an "8" symbol outcome, etc. only the evaluation which produces the highest payout is selected and applied.

Figure 3:
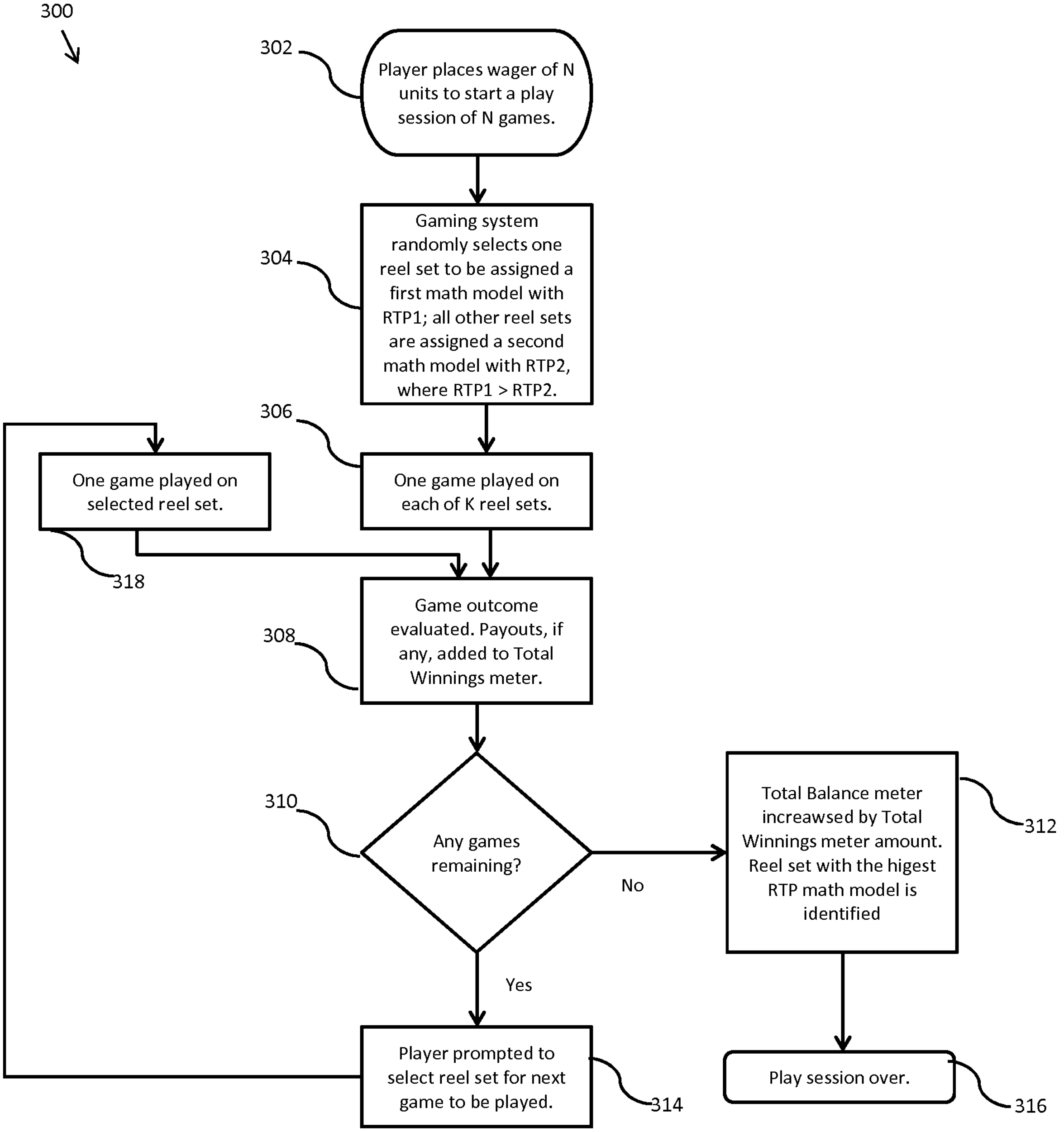
FIG. 3 is a flow chart illustrating an embodiment where the player selects at least one first reel set to receive exclusive play for a number of sub-rounds where at least one second reel set is not played.

FIG. 3 is a flow chart illustrating an embodiment where the player selects at least one first reel set to receive exclusive play for a number of sub-rounds wherein at least one second reel set is not played. In various embodiments, process 300 is represented by a set of instructions stored in one or more memories and executed by one or more processors. Although process 300 is described with reference to the flowchart shown in FIG. 3, it should be appreciated that many other processes of performing the acts associated with this illustrated process may be employed. For example, the order of certain of the illustrated blocks may be changed, certain of the illustrated blocks may be optional, and/or certain of the illustrated blocks may not be employed.

In this example, the gaming system is configured to operate a slot game with a plurality of reel sets, where each said reel set is its own slot game proposition. At the start of the process 302, the gaming system accepts a wager from the player and initiates a play session, said initiation includes the random selection and/or association of at least one first math model to at least one first reel set and of at least one second math model to at least one second reel set 304 and then the playing of all available reel sets 306. After the games on each of the reel sets is completed, outcomes are evaluated and any winning outcomes are identified and their winnings added to the total winnings. 308.

At this point, if there are any games remaining in the play session 310, the player is prompted to select which reel set is to be played for the next sub-round of play 314. Upon receiving the selection input from the player, the gaming system initiates play on the selected reel set 318, and the win-evaluation-and-handling step 308, and checking-for-remaining-plays step 310 are repeated. After the last available game is played, the check for remaining play step leads to the end-of-game state 312, wherein the tally of all winnings (if any) is displayed, and at least one first reel set is indicates as being the reel set with to which a first math model with the highest return to player relative to all other reel sets in that play session.

In some alternate embodiments not shown in flowchart form, but illustrated by example in FIGS. 1A, 1B, 1C, 1D, 1E, 1F, 1G, 1H, 1I and 1J, the gaming system only prompts the player once per play session to select a reel set for which all remaining plays are to be played without requiring or allowing the player to make a different selection until the play session is terminated. In some other embodiments not shown, the gaming system also offers the player the option of playing out all remaining spins without requiring additional player input but the game system will also accept input during the play session to allow the player to select a different reel set before the play session is over. In some embodiments not shown, the gaming system also offers the player the ability to have the remaining spins played on all the reel sets. In the case where there are fewer plays than reel sets in the final sub-round, the gaming system will select the reel sets to play based on some rule such as by numeric order of the reel sets.

Figure 4:
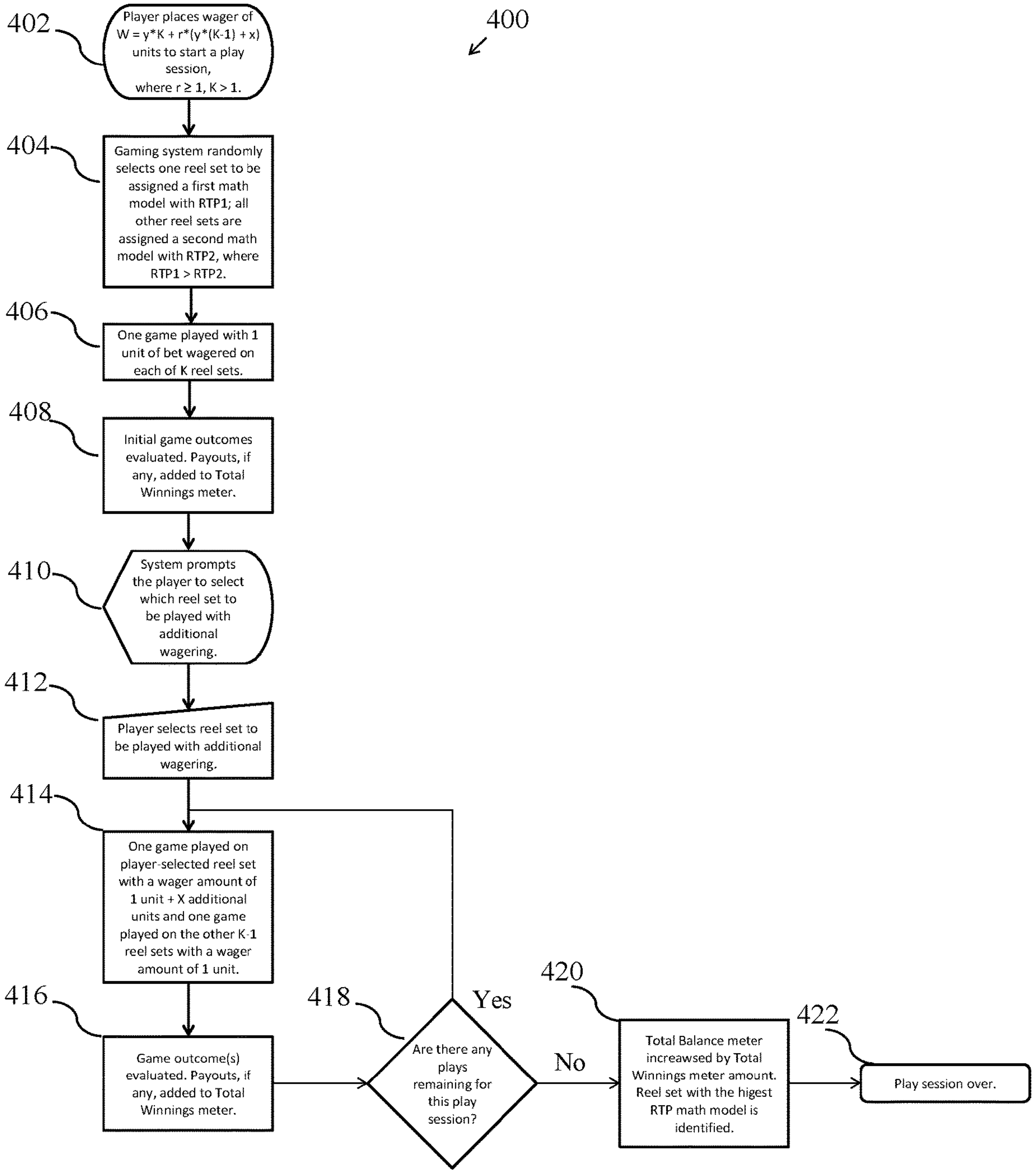
FIG. 4 is a flow chart illustrating an embodiment where the player selects at least one first reel set to be played for a first wager amount for one or more sub-rounds where at least one second reel set is also played for a second wager amount.

FIG. 4 is a flow chart illustrating an embodiment where the player selects at least one first reel set to be played for a first wager amount for one or more sub-rounds where at least one second reel set is also played for a second wager amount. In various embodiments, process 400 is represented by a set of instructions stored in one or more memories and executed by one or more processors. Although process 400 is described with reference to the flowchart shown in FIG. 4, it should be appreciated that many other processes of performing the acts associated with this illustrated process may be employed. For example, the order of certain of the illustrated blocks may be changed, certain of the illustrated blocks may be optional, and/or certain of the illustrated blocks may not be employed.

In the embodiments described by the flowchart in FIG. 4, all of the reel sets are played in each sub-round. How this fundamentally varies from traditional multi-game slot games (other than the assignment of math models with differing RTP to the reel sets) is that the player has the ability to selected at least one first reel set which is to be played with a first wager whereas at least one second reel set is to be played with a second wager, where the first wager and second wager are of different amount.

At the start of the game 402, the gaming system accepts a wager "W" which is large enough to fund: (a) a first sub-round where each of "K" number of reel sets is played for a wager of "y" number units, for y*K total units, and (b) "r" number of repeat sub-rounds where for each said sub-round, one reel set is played for a wager of "x" number of units and the remaining K−1 units are played for a wager of "y" number of units. Therefore, the total units wagered for each sub-round is $x+y*(K-1)$, and the total units wagers across all the repeat sub-rounds is $r*(x+y*(K-1)$, and the total units wagers across the entire play session is $y*K+r*(x+y*(K-1))$, noting that r is an integer greater than or equal to 1, K is an integer greater than 2, and the wager value of x is not the same as the wager value of y.

After the gaming system accepts a wager from the player 402 the gaming initiates a play session, said initiation includes the random selection and/or association of at least one first math model to at least one first reel set and of at least one second math model to at least one second reel set 404 and then the playing of all available reel sets 406. After the games on each of the reel sets is completed, outcomes are evaluated and any winning outcomes are identified and their winnings added to the total winnings. 408.

At this point, the gaming system prompts the player 410 to select at least one first reel set to receive a first wager amount and therefore selecting by default at least one second reel set will be played by a second wager amount. Upon receiving the player's input 412, the gaming system continues to play off the remaining plays with the specified wagering 414. After evaluating and handling winning outcomes 416, the gaming system determines if any plays are remaining in the play session 418. If there are remaining plays, then the play and evaluate cycle 414, 416 is repeated, else the end-of-game state 312, wherein the tally of all winnings (if any) is displayed, at least one first reel set is indicates as being the reel set with to which a first math model with the highest return to player relative to all other reel sets in that play session.

In some other embodiments not shown, the gaming system only prompts the player at the start of each repeat sub-round in which additional plays are available for play to select at least one first reel set which is to be played for a first wager and therefore selecting by default at least one second reel set will be played by a second wager amount. In some other embodiments not shown, the gaming system also offers the player the option of playing out all remaining spins without requiring additional player input but the game system will also accept input during the play session to allow the player to select at least one first reel set which is to be played for a first wager and therefore selecting by default at least one second reel set will be played by a second wager amount. In some embodiments not shown, the gaming system also offers the player the ability to have the remaining spins played on all the reel sets for the same second wager amount. In the case where there are fewer plays than reel sets in the final sub-round, the gaming system will select the reel sets to play based on some rule such as by numeric order of the reel sets.

Figure 5:
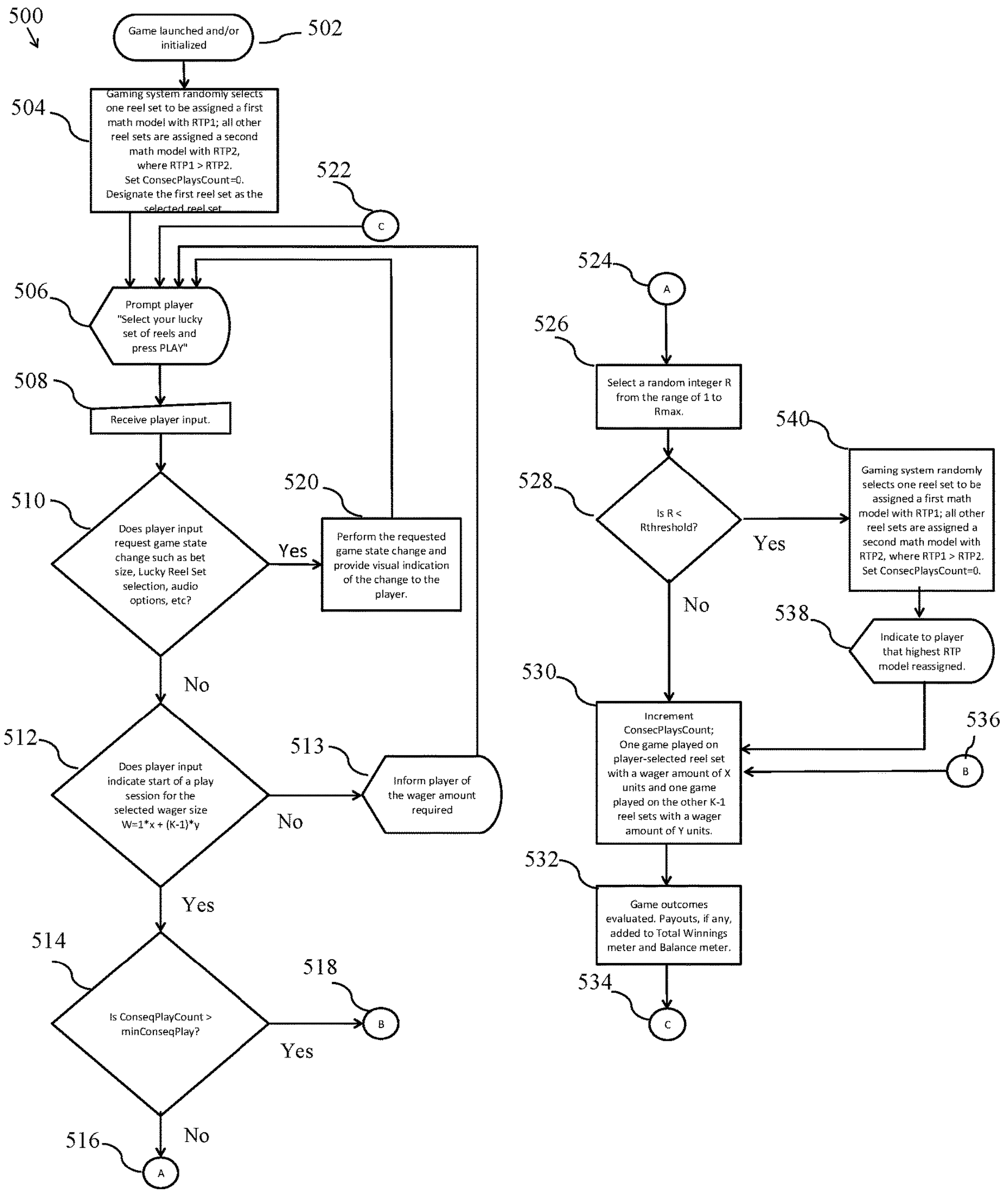
FIG. 5 is a flow chart illustrating an embodiment where the player selects at least one first reel set to be played for a first wager amount for one a single sub-round play session where at least one second reel set is also played during the single sub-round play session for a second wager amount.

FIG. 5 is a flow chart illustrating an embodiment where the player plays a first reel set for a first wager amount for one a single sub-round play session where at least one second reel set is also played during said single sub-round play session for a second wager amount. In other words, in this example there are no repeat sub-rounds, just a single play session in which all reel sets are played. However, the gaming system does maintain state from game to game. Although process 500 is described with reference to the flowchart shown in FIG. 5, it should be appreciated that many other processes of performing the acts associated with this illustrated process may be employed. For example, the order of certain of the illustrated blocks may be changed, certain of the illustrated blocks may be optional, and/or certain of the illustrated blocks may not be employed.

Process 500 begins with the initialization of the game 502. For a casino slot machine or any other stand-alone gaming device, that would be the result of an initial power-up or any subsequent power cycle or gaming system reset. For gaming systems involving a client-server implementation, the initialization would occur when the player launches a game on his or her client device. In some embodiments, the initialization occurs once when a registered player initially plays and thereafter, the state is stored and associated with said player. In some other embodiments, the initialization occurs every time a game is launched whether just for anonymous players or also for registered players. Initialization 504 includes the random selection and/or association of at least one first math model to at least one first reel set and of at least one second math model to at least one second reel set 404 and then the playing of all available reel sets 406, and also includes the initialization of variable ConsecPlaysCount and the designation of a default first reel set to be played with a first wager "x" which foregoes requiring a player prompt for the very first selection.

In the present example, ConsecPlaysCount=0. In some other embodiments not shown, especially with embodiments where the system is initialized every time a game is launched a new, ConsecPlaysCount may be assigned a non-zero number such as a number randomly selected from a range of numbers, say 0 to the value MinConsecPlay−1, where the MinConsecPlay value represents the minimum number of consecutive play sessions for which no math model reselection and/or reassignment is to occur once the player has played a certain number of games since initialization.

The gaming systems primary process loop begins with the display of a player prompt to solicit the start of a game 506. The gaming system can receive 508 and interpret 510, 512 a number of potential inputs. If the input is a request other than the authorization of a wager, 510, such as standard slot-game requests for changing bet size, transferring funds into or out of the balance, adjusting audio, etc. the gaming system attends to the request, which typically includes visual acknowledgement of the success or failure of the request, before returning to the initial prompt 506 and input polling 508. The gaming system also accepts input to allow the player to select a different reel set from the one presently designated as the reel set to receive the first wager amount of "y", however, unlike the earlier example, the players is not required to necessarily select the reel set that is to receive special treatment, which in this example, is the playing with a higher wager than is being played on the other reel sets.

If the input is an authorization to place a wager and start play 512, the wager value "W" must be sufficient large to fund a single round of play wherein one reel set is played for a first wager of "x" number of units and the remaining K−1 reel sets are played for a wager of "y" number of units. Therefore, the total units wagered is x+y*(K−1). In some other embodiments not shown, the gaming system allows for a plurality of first reel sets to be played for a first wager amount and a plurality of second reel sets to be played for a second wager amount. In some other embodiments not shown, the gaming system allows for three or more different wager amounts to be played within the same play session. If the gaming system determines that the wager amount is insufficient 512, the gaming system displays a message to the player indicating the problem and/or wagering requirements 513, before returning to the initial prompt 506 and input polling 508. If the gaming system determines that the wager amount is sufficient 512, the gaming system then determines if a sufficient number of consecutive plays have been played 514. If not, then following the outgoing on-sheet connector "A" 516 to the incoming on-sheet connector "A", the next process step is to determine a random number "R" for the purpose of determining whether a game model reselection and/or reassignment step 540 needs to be done.

For example, for the values "Rmax"=16, and "Rthreshold"=12, then 12/16ths or three-fourths of the time, on average, a game model reselection and/or reassignment step will be done, and one-fourth of the time said step is bypassed. In some embodiments not shown, the gaming system always causes a game model reselection and/or reassignment step after the specified number of consecutive plays have occurred. In some embodiments not shown, the value of "Rthreshold" changes based on other factors such as, but not limited to: (a) value of ConsecPlaysCount; or (b) one or more of the player's prior game outcomes; or (c) player's balance; or (d) player's wager amount; or (e) player's loyalty program points; or (f) any suitable factor; or (g) any combination thereof. In some embodiments not shown, there are additional process steps associated with the player changing the size of his or her wager relative to said player's last game. For example, in some variations, an increase in wager size forces a game model selection and/or assignment step. In some embodiments not shown, there is a maximum number of consecutive games that can be played before a game reselection and/or reassignment step is forced. In some embodiments not shown, the reselection and/or reassignment is permitted to result in the same configuration as the prior state. In some embodiments not shown, the reselection and/or reassignment is required to not produce that same configuration as the prior state.

If a math model reselection and/or reassignment 540 does occur, this includes the gaming system resetting the "ConsecPlaysCount" variable and providing some indication to the player 538 that said math model reselection and/or reassignment 540 occurred. Whether a math model reselection and/or reassignment 540 occurs, or whether said reassignment and/or reselection did not occur based on the random selection evaluation 528, or whether said reassignment and/or reselection did not occur because of an insufficient number of consecutive games have been played since the previous reassignment and/or reselection 514, 518, 538, the gaming system commences with game play 530. Specifically, commencement of game play 530 consists of the incrementing the "ConsecPlaysCount" variable to reflect the playing of another play session, and the actual playing of the reel sets. In this example, the selected reel set is played with a first wager amount "X" and all the other reel sets are played with a second wager amount "Y". Once game play is concluded, the gaming system evaluates and identifies winning outcomes and pays out any corresponding awards accordingly, prior to returning to the primary player prompt 506 and input polling 508.

In some other embodiments not shown, the gaming system provide a free spins bonus round, the behavior of which depends upon such factors as, but not limited to, (a) which sub-round was in play when said free spins bonus triggered; or (b) on which reel set or reel sets did the trigger or triggers occur on; or (c) which reel set was selected for special treatment; or (d) any other suitable factor or (e) any combination thereof. For example, in the embodiments illustrated by FIG. 5, a bonus event of any sort triggered on a reel set with a particular wager size, the gaming system uses said wager size as a basis for determining the value of any awards earned in said bonus event.

Figure 6:
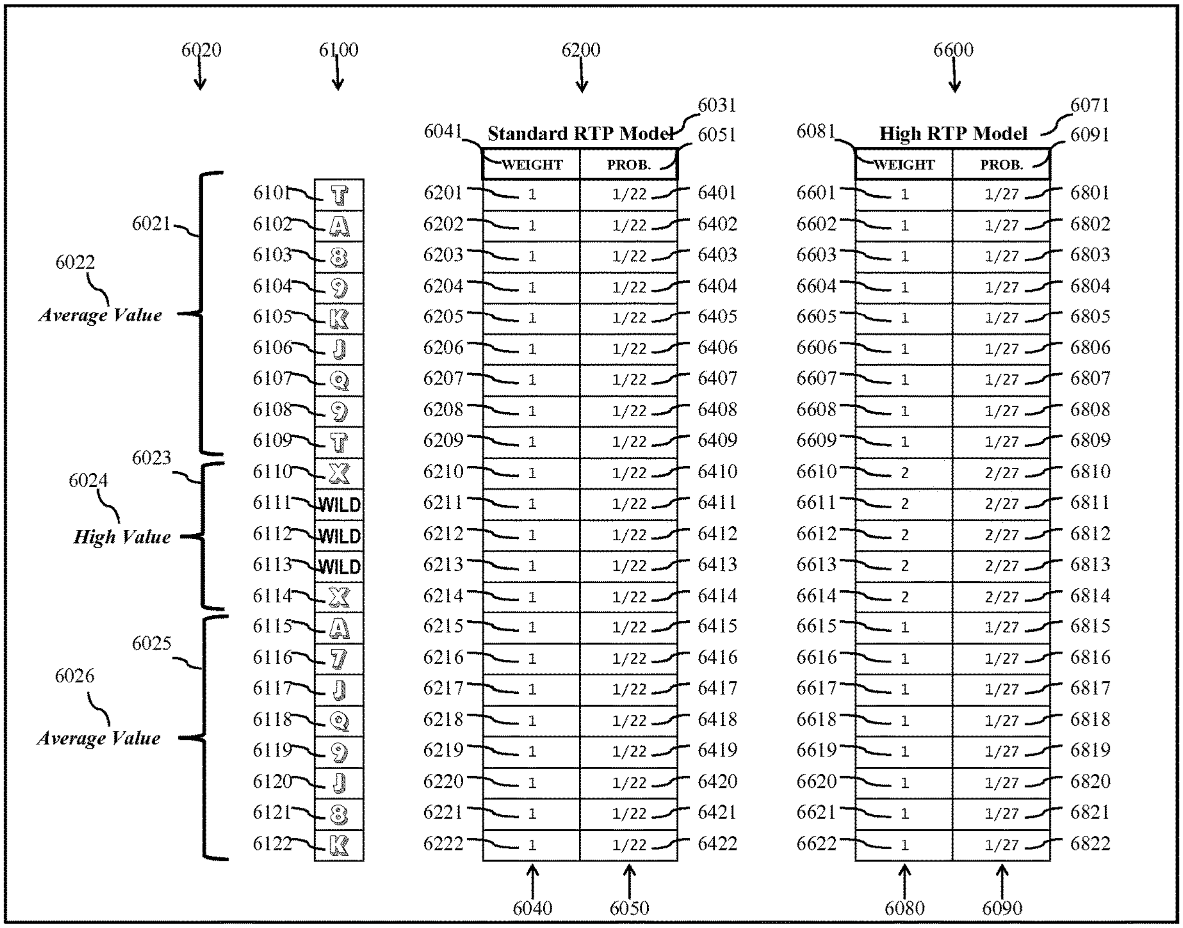
FIG. 6 illustrates the different weighting applied to the same reel strip by different math models in order to achieve different RTP and provides an example of matching a set of slot-game outcomes to a visible reel strip for the purpose of controlling the symbols that can be seen during the reel spin.

FIG. 6 illustrates example weightings 6200, 6600 associated respectively with a first math model 6031 and second math model 6071, wherein the second math model (designated as "HIGH RTP MODEL" 6071) offers a higher RTP than the first math model (designated as "STANDARD RTP MODEL" 6031), and wherein the weighting from each math model apply to the same reel strip 6100. The reel strip 6100 consists of a linear arrangement of twenty-two symbols 6101, 6102, 6103, 6104, 6105, 6106, 6107, 6108, 6109, 6110, 6111, 6112, 6113, 6114, 6115, 6116, 6117, 6118, 6119, 6120, 6121, 6122, where each of said symbol corresponds to one of the winning outcomes defined in the FIG. 2 paytable 200. The grouping 6021 of the first ten symbols 6101, 6102, 6103, 6104, 6105, 6106, 6107, 6108, 6109, 6110 designated as "AVERAGE VALUE" 6022 and the grouping 6025 of last eight symbols 6115, 6116, 6117, 6118, 6119, 6120, 6121, 6122 also designated as "AVERAGE VALUE" 6025 are comprised of only the symbols which correspond to FIG. 2. paytable 200 lowest eight awards 203, 204, 205, 206, 207, 208, 209, 210. The grouping 6023 of the interior symbols 6110, 6111, 6112, 6113, 6114, designated as "HIGH VALUE" 6024 are comprised of only the symbols which correspond to FIG. 2. paytable 200 lowest eight awards 201, 202.

It is generally true that the higher the frequency of symbols associated with higher payouts there are on reel strips, the higher the RTP generated. The correlation between high-value symbol frequency on any single reel strip and the overall payout of the slot game incorporating said reel strip is guaranteed if the same set of weighting reel strip or same set of unweighted reel strips are applied to each reel display area of the same reel set.

Figure 7:
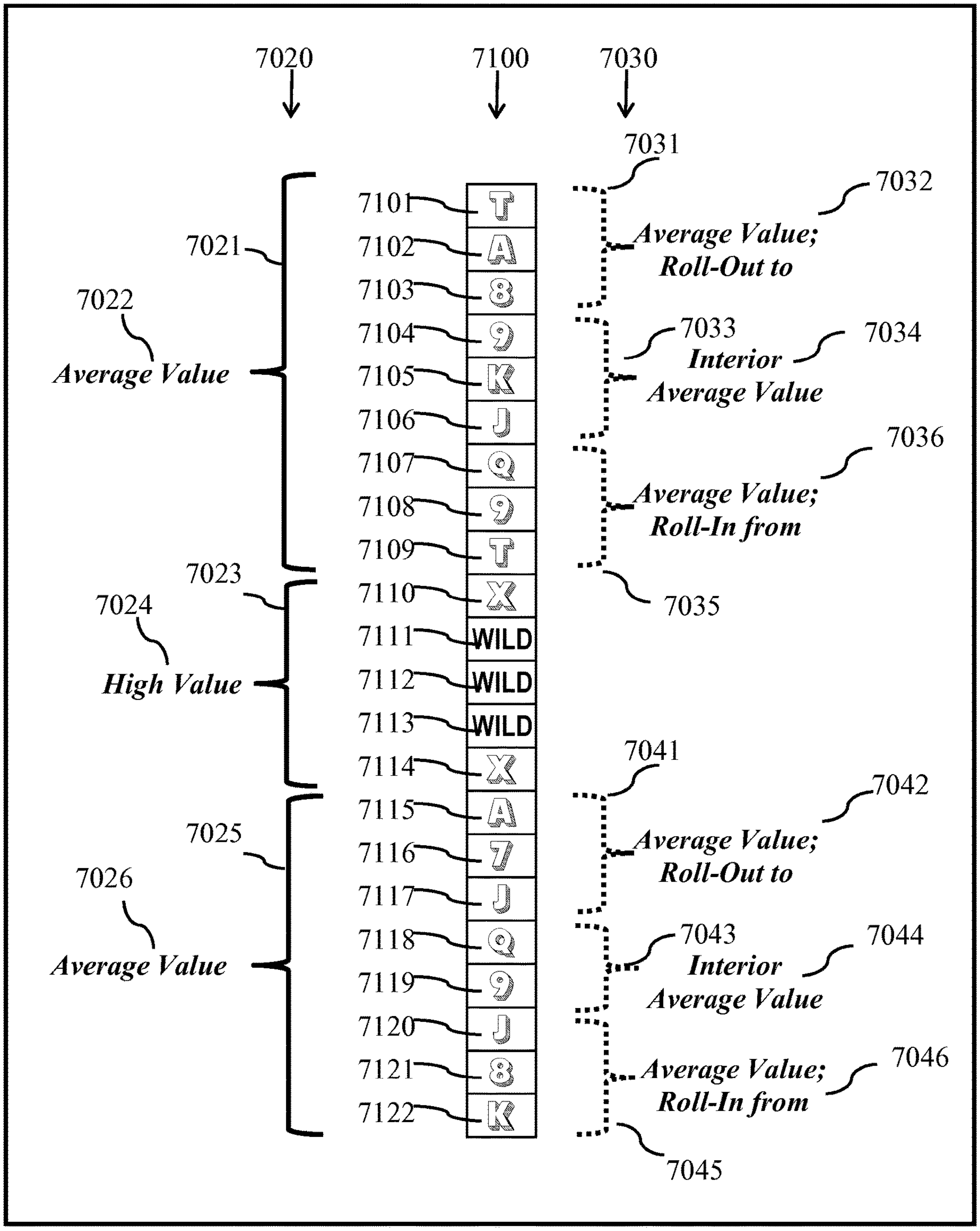
FIG. 7 illustrates additional sub-categorization of the reel strip shown in FIG. 6 as the first step in the creation of a final-display reel strip.
Figure 8:
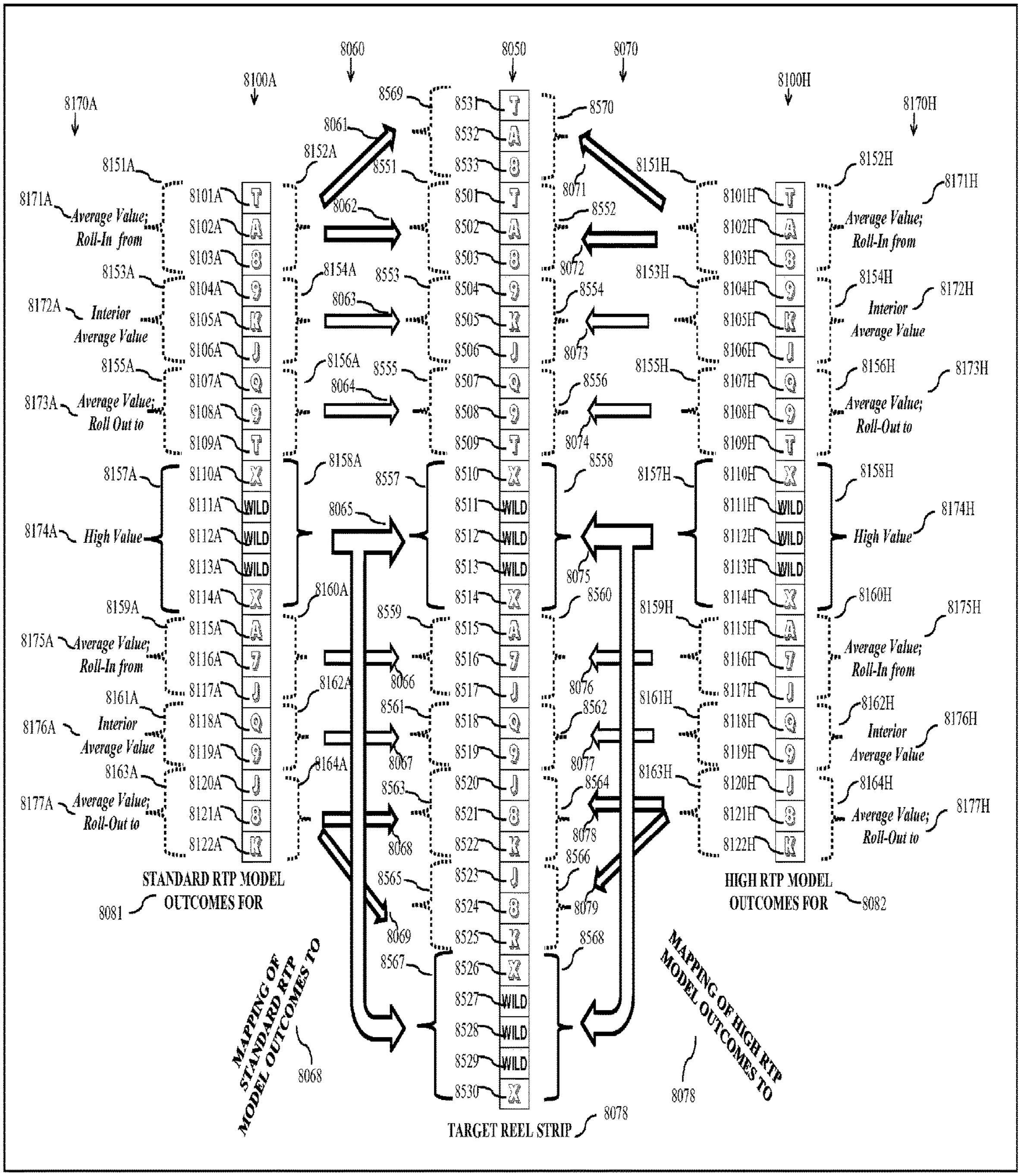
FIG. 8 illustrates a final-display reel strip and how outcomes from core reel strips are mapped thereto based on the math model associated with the core reel strip.

For the purposes of the examples illustrated in FIG. 6, FIG. 7 and FIG. 8, though not specifically shown, the math and game rules such that there is direct correlation between high-value symbol frequency on any individual reel strip and the overall payout of the slot game incorporating said reel strip. Another assumption made for the purposes of simplifying the examples illustrated in FIG. 6, FIG. 7 and FIG. 8, is that this is for embodiments only a single symbol position displayed on any given reel strip segment corresponds to a payline, as would be the case in a slot game with a single payline or in a video slot game where the display of individual reel symbol positions is each driven by its own reel strip. Neither of the simplifying assumptions listed in this paragraph are required to implement embodiments of the present disclosure.

FIG. 6 includes two tables 6200, 6600 of reel strip weightings 6040, 6080, for two different math models: "Standard RTP Model" 6031 and "High RTP Model" 6071. The set of weights 6040 for Standard RTP Model 6031 and the set of weights 6050 for the High RTP Model are used by the gaming system to randomly select the reel strip stopping position. Next to each column of weights 6040, 6080 is a column of probabilities 6050, 6090 listing the probability of selection for each weight. For example, the probably that the first "X" symbol 6110 will be selected under a Standard RTP Model 6031 is 1/22nds or 4.545454% 6410 based on the fact that a weight of "1" 6210 is associated with that reel strip position and the sum of the weights 6040 for Standard RTP Model 6031 is 22. Similarly, the probably that the first "X" symbol 6610 will be selected under a High RTP Model 6071 is 2/27ths or 7.407407% 6810 based on the fact that a weight of "2" 6610 is associated with that reel strip position and the sum of the weights 6080 for High RTP Model 6031 is 27.

Each of the symbols 6110, 6111, 6112, 6113, 6114 in the High Value 6024 section 6023 of the reel strip 6100, is more likely to be selected 6810, 6811, 6812, 6813, 6814 under a High RTP Model 6071 reel strip index selection than it is to be selected 6410, 6411, 6412, 6413, 6414 under a Standard RTP Model 6031 reel strip index selection. Therefore, a given reel set will have a higher RTP when all of said reel sets reel strips are associated with said High RTP Model 6071 reel strip weighting 6600 instead of when all of said reel sets reel strips are associated with said Standard RTP Model 6031 reel strip weightings 6200. This also demonstrates how a given reel set can provide different RTP play without changing the visible reel strips.

In a client-server implementation of said example, there would be no telltale information passed to client that could be intercepted by a hacker which would positively identify which math model is assigned to any given reel strip. A hacker could only obtain the same information as a regular player which is the final reel strip indices generated by and sent from the client. One might assume that a reel set observed to be generating high-value symbol results more often than the other reel sets in the game was the reel set to which the higher RTP math model was associated, but one could not know this for sure.

While the implementation of some embodiments of the current disclosure described in the preceding paragraph can be securely implemented in a client-server architecture, said implementation lacks the ability to provide additional clues to the player as to which reel set is assigned a higher RTP math model other than final outcomes, such as providing visible reel strip spins that over the long term for a given math model association, display a higher or lower frequency of high-value symbols relative to a different math model.

FIG. 7 and FIG. 8 illustrate an example as to how the client of a gaming device can provide a different reel spin display experience for a given reel set based on the math model associated which can be securely provided in client-server implementations, and which does not change the method of initial outcome generation, and which does not change the reel strip spin display functionality. This is accomplished by providing a mapping function between a core reel strip for which the server generates outcomes and a larger specially created final-display reel strip. The term "core reel strip" indicates the minimum required reel strip configuration information required to generate outcomes. The term "final-display reel strip" indicates the reel strip, or its data equivalent, used for the display of reel spins.

FIG. 7 illustrates additional sub-categorization of the reel strip shown in FIG. 6 as the first step in the creation of a final-display reel strip. The upper "Average Value" 7022 grouping 7021 of symbols 7101, 7102, 7103, 7104, 7105, 7106, 7107, 7108, 7109 can be further subdivided into three sub-groupings: a sub-grouping 7031 of the "Nout"=3 symbols 7101, 7102, 7103, at the top of the grouping 7021 labeled "Average Value; Roll-Out to Top of Strip" 7032, a sub-grouping 7035 of the "Nin"=3 symbols 7107, 7108, 7109, from the bottom of the grouping 7021 labeled "Average Value; Roll-In from High Value" 7036, and a sub-grouping 7033 of any arbitrary number of remaining symbols which in this case include the symbols 7104, 7105, 7106, labeled "Interior Average Value". In some alternate embodiments not shown, the number symbol remaining in the original grouping after the "Nin" and "Nout" symbols have been identified is zero, or in other words, there is no interior sub-grouping. In some alternate embodiments not shown, "Nin" and "Nout" are different values. In some alternate embodiments not shown, the values for "Nin" and/or "Nout" differ based on which reel position is being considered, such as, for example, the left-most reel strip column having a larger "Nout" value than the center-most reel strip column, and the right-most reel strip column having a larger "Nin" than the center-most reel strip column based on the timing dynamics of reel strip spins start simultaneously or nearly simultaneously but stop sequentially.

The label "Average Value; Roll-Out to Top of Strip" 7032 for the sub-grouping 7031 indicates that its symbols are of average value, not high value, and that the top of the sub-grouping 7031 is also the top of the reel strip which will become an important designator relative to the final-display reel strip which is to be created based upon this example core reel strip 7100. The label "Average Value; Roll-In from High Value" 7036 for the sub-grouping 7035 indicates that its symbols are of average value, not high value, and that the bottom of the sub-grouping 7035 is adjacent to the start of a high-value reel strip segment.

The terms "Roll-Out from" and "Roll-In to" are based on the standard practice in the gaming industry for symbols on reel strip segment visible to the player move downwards. When a given reel strip is spinning without interruption, symbols appear in ascending order in the reel strip display area. The strip is moving downwards relative to the display therefore the next new symbol to become visible is above the one or more symbols presently visible on a given reel strip. Because the reel strip forms a loop, the symbol above the symbol shown at the top of a reel strip will be the symbol at the bottom of same said reel strip. Therefore, in terms of changing symbol display during reel spins, the display "runs out from" the current visible segment of reel strip symbols thus "running in to" the segment of reel strip symbols above the currently visible segment. In other words, the display runs "out from" the top of one segment thus runs "in to" the bottom of the next higher segment. So in the case of sub-grouping 7035 labeled "Average Value; Roll-In from High Value" 7036, the symbols from said said-grouping would appear just after the high value symbols 7110, 7111, 7112, 7113, 7114 which comprise the "High Value" 7024 grouping 7023.

The selection of which neighboring reel strip segments a given segments runs in from or out to is what can affect the value of the symbols that are visible during reel spins. Outcomes which start below a high-value segment of symbols and outcome which end above a high-value segment of symbols are more likely to result in the player seeing high-value symbols in the reel spin that are not in the outcome itself.

The lower "Average Value" 7026 grouping 7025 of symbols 7115, 7116, 7117, 7118, 7119, 7120, 7121, 7122, can be further subdivided into three sub-groupings: a sub-grouping 7041 of the "Nout"=3 symbols 7115, 7116, 7117, at the top of the grouping 7025 labeled "Average Value; Roll-Out to High Value" 7044, a sub-grouping 7045 of the "Nin"=3 symbols 7120, 7121, 7122, from the bottom of the grouping 7025 labeled "Average Value; Roll-In from Bottom of Strip" 7036, and a sub-grouping 7043 of any arbitrary number of remaining symbols which in this case include the symbols 7118, 7119, labeled "Interior Average Value" 7044.

In its present form, the example reel strip 7100 has segments of average-value symbols at the top and bottom of the reel strip, effectively making this just a longer segment of average-value symbols. However, a final-display reel strip can be constructed to better leverage Roll-In to and Roll-Off from display opportunities.

FIG. 8 illustrates a final-display reel strip 8050 and indicates how outcomes from core reel strips 8100A, 8100H are mapped 8060, 8070 thereto 8050 based on the math model 8081, 8082 associated with said core reel strip 8100A, 8100H. Elements from FIG. 7 including the core reel strip 7100 and the core reel strip's sub-categorization 7030 have been reproduced in FIG. 8 for Standard RTP Model outcomes 8081 depicted on the left side of FIG. 8 (with core reel strip 8100A and core reel strip sub-categorization 8170A) and for High RTP Model outcomes 8082 depicted on the right side of FIG. 8 (with core reel strip 8100H and core reel strip sub-categorization 8170H). A subsection of final-display reel strip 8050 is comprised of the same symbols 8501, 8502, 8503, 8504, 8505, 8506, 8507, 8508, 8509, 8510, 8511, 8512, 8513, 8514, 8515, 8516, 8517, 8518, 8519, 8520, 8521, 8522 and in the same order as the symbols 8101A, 8102A, 8103A, 8104A, 8105A, 8106A, 8107A, 8108A, 8109A, 8110A, 8111A, 8112A, 8113A, 8114A, 8115A, 8116A, 8117A, 8118A, 8119A, 8120A, 8121A, 8122A or 8101H, 8102H, 8103H, 8104H, 8105H, 8106H, 8107H, 8108H, 8109H, 8110H, 8111H, 8112H, 8113H, 8114H, 8115H, 8116H, 8117H, 8118H, 8119H, 8120H, 8121H, 8122H, found in either depiction 8100A, 8100H of the core reel set.

The final-display reel strip 8050 is also comprised of additional copies of reel strip segments found in the core reel strip 8100A. Specifically, the segment 8151A of three symbol 8101A, 8102A, 8103A in the "Average Value; Roll-In from Top of Strip" 8171A category of the core reel strip 8100A appears twice 8569/8570, 8551/8552 at the top of final-display reel strip 8050. The lower segment 8551/8552 is part of the subsection which comprises the entirety of the core reel strip 8100A. The upper segment is included in final-display reel strip 8050 so as to provide a high-value roll-in adjacency meant primarily for High RTP Model outcomes.

Similarly, the segment 8177A of three symbol 8120A, 8121A, 8122A in the "Average Value; Roll-Out to Bottom of Strip" 8177A category of the core reel strip 8100A appears twice 8565/8666, 8567/8568 near the bottom of final-display reel strip 8050. The upper segment 8567/8568 is part of the subsection which comprises the entirety of the core reel strip 8100A. The lower segment is included in final-display reel strip 8050 so as to provide a high-value roll-in adjacency meant primarily for High RTP Model outcomes. The high-value adjacency mentioned in this paragraph and the preceding paragraph is accomplished by the addition of a copy of another sub-section of the core reel strip 8100A. Specifically the segment 8174A of five symbol 8110A, 8111A, 8112A, 8113A, 8114A, in the "High Value" 8177A category of the core reel strip 8100A is at the bottom 8567/8568 of the final-display reel strip 8050. It should be noted that depicting the added segment 8567/8568 of high-value symbols 8526, 8527, 8528, 8529, 8530 at the bottom of the final-display reel strip 8050 is functionally the same as a depiction, not included, the added segment 8567/8568 of high-value symbols 8526, 8527, 8528, 8529, 8530 at the top of the final-display reel strip 8050.

The desired effect of having high-value symbols appear more frequently during reel spins associated with a High RTP Model as compared to reel spins associated with a Standard RTP Model is based on an asymmetrical mapping of outcomes from a core reel strip outcome 8081, 8082 to the final-display reel strip 8050 based on the associated math model. The black arrows 8063, 8065, 8066, 8067, 8073, 8074, 8076, 8077, represent direct, invariant mapping from the core reel strip 8100A, 8100H to the final-display reel strip 8050. On the other hand, the white arrows 8061, 8062, 8071, 8072, and the bifurcated white arrows 8065, 8075, represent variable and/or redirected mapping.

For the bifurcated white arrows 8065, 8075, any apportionment of the mapping of core reel strip outcomes to final-display reel strip 8050 positions is feasible, including apportionments in which only one branch of a given arrow is always followed. However, for secure client-server implementations, an implementation wherein each of the two branches is equally likely to mapped for any given outcome would provide no additional information to a hacker that a regular player would be able to observe. A non-equal apportionment should also be safe as long as the mapping tendency is exactly the same for Standard RTP Model mapping as for High RTP Model mapping and that both branches are active.

The asymmetrical mapping required for providing differing reel spin relies upon the mapping indicated by the white arrows 8061, 8062, 8570, 8571, 8071, 8072, 8078, 8079. For the greatest visual differentiation, 100% of Standard RTP Model outcomes in the Average Value; Roll-In from Top of Strip 8171A sub-category 8151A would map to final-display reel strip 8050 segment 8551/8552 which is adjacent only to other average value segments 8569/8570, 8553/8554. Similarly 100% of the High RTP Model outcomes in the Average Value; Roll-In from Top of Strip 8171H sub-category 8151H would map to final-display reel strip 8050 segment 8569/8570 which is Roll-In adjacent to the added High Value segment 8567/8568. Along the same lines, 100% of Standard RTP Model outcomes in the Average Value; Roll-Out to Bottom of Strip 8177A sub-category 8163A would map to final-display reel strip 8050 segment 8563/8564 which is adjacent only to other average value segments 8561/8562, 8565/8566. Similarly 100% of the High RTP Model outcomes in the Average Value; Roll-Out to Bottom of Strip 8177H sub-category 8163H would map to final-display reel strip 8050 segment 8565/8566 which is Roll-Out adjacent to the added High Value segment 8567/8568.

For secure client/server implementations, it is best not to have positions on the final-display reel strip that can only be accessed by a subset of the possible math models. A hacker who knows of such exclusive mapping or can deduce said exclusive mapping over time would be able to obtain full confirmation of math model association that a regular player would not. Therefore, a secure client/server implementation should avoid 100%-0% apportionment and thus map along both branches of each respective pair 8061 & 8062, 8570 & 8571, 8071 & 8072, 8078 & 8079 of white arrows. However, an asymmetric, unbalanced apportionment would provide for greater reel spin visual differentiation relative to the math model assigned. Specifically, the mappings described in the previous paragraph identify those branches which are to get the majority apportionment rather than the entirety of apportionment. For example, a majority, say 80% of Standard RTP Model outcomes in the Average Value; Roll-In from Top of Strip 8171A sub-category 8151A mapping to final-display reel strip 8050 segment 8551/8552, leaving 20% of said Standard RTP Model outcomes to be mapped to the 8569/8570 equivalent segment which is located next to the richer looking 8567/8568 segment. Players will still see more high value symbols during reel spins associated with the higher RTP math model but no portion of the final-reel strip is accessed by only a subset of the math models.

Some portions of the disclosure are presented in terms of algorithms (e.g., as represented in flowcharts, prose descriptions, or both) and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality. However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

It should be understood that the term "random number generator" as used in some embodiments herein for the provision of a random number, and often referred to by the acronym "RNG", is a device or process that generates a sequence of values that cannot be reasonably predicted better than random chance which from some specified distribution such that selection of a large set of these numbers reproduces the underlying distribution. Random number generators used for random determinations within gaming devices such as random selections and/or random arrangements are usually implemented via one or more computer devices executing a process commonly referred to as a pseudo-random number generator. In practice, the target distribution of the most basic random number generators in gaming systems is a uniform distribution. Other kinds of distributions are subsequently accomplished by mapping uniform distribution outcomes to final distribution values via a weighted table or other suitable mapping methods.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for the purposes of enablement and best mode.

Those skilled in the art will appreciate that the types of software and hardware used are not vital to the full implementation of the methods of the invention. The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth in the claims and equivalents thereto.

The invention claimed is:

1. An electronic gaming system comprising:

at least one processor;

at least one display device;

at least one random number generator;

at least one input device; and at least one memory device storing a plurality of instructions which, when executed by the at least one processor, cause the at least one processor to operate with the at least one display device and the at least one input device to:

a) display a plurality of independent games on the at least one display device responsive to receiving input data relating to an amount available for wagering through the at least one input device, wherein each of a plurality of independent games displayed is associated with one of a plurality of sets of game outcome determination parameters;

b) receive a game play selection from the at least one input device, the game play selection identifying at least one first independent game of the plurality of independent games to play for at least one first wager amount and identifying at least one second independent game to be played for least one second wager amount;

c) generate a game outcome for each of the at least one first and the at least one second independent games responsive to receiving the game player selections;

d) determine any award associated with any displayed winning game outcome in the at least one first and the at least one second independent games responsive to generating each of the game outcomes; and e) provide any determined award, wherein the determined award is enabled for wagering through the input device.

2. The gaming system of claim 1, wherein a first set of game outcome determination parameters associated with at least one first independent game provides a first mathematically expected long-term return to player payback percentage and a second set of game outcome determination parameters associated with at least one second independent game provides a second mathematically expected long-term return to player payback percentage which differs from the first mathematically expected long-term return to player payback percentage.

3. The gaming system of claim 1, wherein the gaming system associates a first set of game outcome determination parameters with at least one first independent game and associates a second set of game outcome determination parameters associated with at least one second independent game.

4. The gaming system of claim 3, wherein the associations are randomly determined at least once every play session.

5. The gaming system of claim 3, wherein the associations are randomly determined upon the evaluation of a threshold condition.

6. The gaming system of claim 5, wherein the threshold condition is based on the number of independent games played since the gaming system last performed the associations.

7. The gaming system of claim 5, wherein the threshold condition is based on the number of game play sessions initiated since the gaming system last performed the associations.

8. The gaming system of claim 5, wherein the threshold condition is based on the occurrence of at least one specified outcome from the play of at least one independent game.

9. The gaming system of claim 8, the at least one specified outcome is a winning outcome.

10. The gaming system of claim 8, the at least one specified outcome is a non-winning outcome.

11. The gaming system of claim 3, wherein the gaming system provides indication of at least one defining characteristic of the set of game determination outcome parameters associated specifically with at least one independent game.

12. The gaming system of claim 11, wherein the indication occurs at the end of the play session.

13. The gaming system of claim 11, wherein the indication occurs before the end of the play session based on some condition.

14. The gaming system of claim 1, wherein the gaming system provides a plurality of rounds of play in which the play of at least one independent game is provided per round of play.

15. A method of providing electronic games on an electronic gaming device, the electronic gaming device including at least one processor, at least one display device, at least one random number generator, at least one input device, and at least one memory device storing a plurality of instructions which, when executed by the at least one processor, cause the at least one processor to operate with the at least one display device, the at least one random number generator and the at least one input device, all in connection with the method comprising the steps of:

a) displaying a plurality of independent games on the at least one display device responsive to receiving input data relating to an amount available for wagering through the at least one input device, wherein each of a plurality of independent games displayed is associated with one of a plurality of sets of game outcome determination parameters;

b) receiving a game play selection from the at least one input device, the game play selection identifying at least one first independent game of the plurality of independent games to play for at least one first wager amount and identifying at least one second independent game to be played for least one second wager amount, wherein a first set of game outcome determination parameters associated with at least one first independent game provides a first mathematically expected long-term return to player payback percentage and a second set of game outcome determination parameters associated with at least one second independent game provides a second mathematically expected long-term return to player payback percentage which differs from the first mathematically expected long-term return to player payback percentage;

c) generating a game outcome for each of the at least one first and the at least one second independent games responsive to receiving the game player selections;

d) determining any award associated with any displayed winning game outcome in the at least one first and the at least one second independent games responsive to generating each of the game outcomes; and e) providing any determined award, wherein the determined award is enabled for wagering through the input device.

16. The method of claim 15, wherein the processor associated a first set of game outcome determination parameters with at least one first independent game and associates a second set of game outcome determination parameters associated with at least one second independent game.

17. A method of administering a wagering game over a communication network, comprising the steps of:

providing a game server and a user interaction server;

providing, by the user interaction server, a client for execution on a user device connected to the network and associated with a player, the user device being remote from the game server;

the game server communicating to the user interaction server and the user interaction server communicating to the user device a display of a plurality of independent games on the user device, wherein each of a plurality of independent games displayed is associated with one of a plurality of sets of game outcome determination parameters;

the client receiving from the user device and communicating to the game server, a game play selection identifying at least one first independent game of the plurality of independent games to play for at least one first wager amount and identifying at least one second independent game to be played for least one second wager amount, wherein a first set of game outcome determination parameters associated with at least one first independent game provides a first mathematically expected long-term return to player payback percentage and a second set of game outcome determination parameters associated with at least one second independent game provides a second mathematically expected long-term return to player payback percentage which differs from the first mathematically expected long-term return to player payback percentage;

the game server generating a game outcome for each of the at least one first and the at least one second independent games responsive to receiving the game player selections and determining any award associated with any game outcome in the at least one first and the at least one second independent games responsive to generating each of the game outcomes; and the game server communicating to the user interaction server and the user interaction server communicating to the user device any determined award, wherein the determined award is enabled for wagering through the input device.

* * * * *